United States Patent
Rodriguez et al.

(10) Patent No.: US 8,429,699 B2
(45) Date of Patent: Apr. 23, 2013

(54) SYSTEMS AND METHODS FOR RESOURCE-ADAPTIVE PROCESSING OF SCALED VIDEO AND GRAPHICS

(76) Inventors: Arturo A. Rodriguez, Norcross, GA (US); Peter Chan, Lawrenceville, GA (US); Ajith Nair, Lawrenceville, GA (US); Ramesh Nallur, Duluth, GA (US); Shashi Goel, Duluth, GA (US)

( * ) Notice: Subject to any disclaimer, the term of this patent is extended or adjusted under 35 U.S.C. 154(b) by 683 days.

(21) Appl. No.: 09/736,661

(22) Filed: Dec. 14, 2000

(65) Prior Publication Data
US 2002/0009149 A1 Jan. 24, 2002

Related U.S. Application Data

(60) Provisional application No. 60/170,995, filed on Dec. 14, 1999.

(51) Int. Cl.
*H04N 7/173* (2006.01)
(52) U.S. Cl.
USPC .......... 725/95; 725/96; 725/85; 725/100; 725/139; 725/151; 348/571; 348/581; 348/575; 345/619; 345/501; 345/537; 345/547; 345/629; 345/530; 345/543; 345/555
(58) Field of Classification Search ............ 375/240.25, 375/240.26, 240.28, 240.2; 725/95, 96, 85, 725/100, 139, 151; 345/619, 629, 501, 537, 345/547, 530, 543, 555, 428, 302; 348/17, 348/18, 19, 20, 384, 387, 390, 571, 581, 348/575, 420; 395/200.61
See application file for complete search history.

(56) References Cited

U.S. PATENT DOCUMENTS

| | | | |
|---|---|---|---|
| 4,216,504 A * | 8/1980 | Boussina et al. | 386/7 |
| 4,881,125 A | 11/1989 | Krause | |
| 5,187,575 A | 2/1993 | Lim | |
| 5,218,435 A | 6/1993 | Lim et al. | |
| 5,262,854 A * | 11/1993 | Ng | 375/240.24 |
| 5,329,309 A | 7/1994 | Dorricott et al. | |
| 5,377,051 A | 12/1994 | Lane et al. | |
| 5,426,464 A * | 6/1995 | Casavant et al. | 348/415 |

(Continued)

FOREIGN PATENT DOCUMENTS

| EP | 0 595 323 A2 | 5/1994 |
|---|---|---|
| EP | 1 026 899 | 8/2000 |

(Continued)

OTHER PUBLICATIONS

U.S. Final Office Action in U.S. Appl. No. 10/663,037 mailed Nov. 24, 2009.

(Continued)

*Primary Examiner* — Shawn An
(74) *Attorney, Agent, or Firm* — Merchant & Gould

(57) ABSTRACT

An embodiment of the present invention provides a system and method for adaptive video decoding. A method for adaptive video decoding includes determining whether a resource constrained mode is to be initiated, and responsive to a determination that the resource constrained mode is to be initiated, initiating the resource constrained mode, including foregoing the decoding of portions of received video input. For example, adaptive video decoding may include foregoing the decompression and reconstruction of selected video frames during intervals of high demand for memory and/or bus bandwidth resources.

20 Claims, 10 Drawing Sheets

U.S. PATENT DOCUMENTS

| | | |
|---|---|---|
| 5,444,491 A | 8/1995 | Lim |
| 5,485,210 A | 1/1996 | Lim et al. |
| 5,614,952 A * | 3/1997 | Boyce et al. ............ 375/240.01 |
| 5,646,693 A * | 7/1997 | Cismas ........................... 348/44 |
| 5,703,966 A | 12/1997 | Astle |
| 5,748,789 A | 5/1998 | Lee et al. |
| 5,812,787 A | 9/1998 | Astle |
| 5,835,149 A | 11/1998 | Astle |
| 5,835,151 A * | 11/1998 | Sun et al. ................... 375/240.2 |
| 5,836,003 A * | 11/1998 | Sadeh ............................. 341/51 |
| 5,844,620 A | 12/1998 | Coleman et al. |
| 5,929,911 A | 7/1999 | Cheney et al. |
| 5,953,506 A * | 9/1999 | Kalra et al. .................... 709/231 |
| 5,956,026 A | 9/1999 | Ratakonda |
| 5,959,684 A * | 9/1999 | Tan et al. ...................... 348/515 |
| 5,982,360 A | 11/1999 | Wu et al. |
| 5,990,860 A * | 11/1999 | Takeuchi ...................... 345/667 |
| 5,995,095 A | 11/1999 | Ratakonda |
| 6,009,231 A | 12/1999 | Aoki et al. |
| 6,043,838 A | 3/2000 | Chen |
| 6,072,531 A | 6/2000 | Shibano |
| 6,072,532 A | 6/2000 | Chieh et al. |
| 6,084,908 A | 7/2000 | Chiang et al. |
| 6,137,948 A | 10/2000 | Moon et al. ..................... 386/68 |
| 6,148,027 A | 11/2000 | Song et al. |
| 6,157,396 A | 12/2000 | Margulis et al. |
| 6,201,927 B1 | 3/2001 | Comer |
| 6,208,692 B1 | 3/2001 | Song et al. |
| 6,233,253 B1 | 5/2001 | Settle et al. |
| 6,326,964 B1 | 12/2001 | Snyder et al. |
| 6,353,633 B1 * | 3/2002 | Her ........................... 375/240.18 |
| 6,360,015 B1 | 3/2002 | Bakhmutsky et al. |
| 6,400,764 B1 | 6/2002 | Bakhmutsky |
| 6,408,101 B1 | 6/2002 | Krishnamurthy et al. |
| 6,414,991 B1 | 7/2002 | Yagasaki et al. |
| 6,430,317 B1 | 8/2002 | Krishnamurthy et al. |
| 6,434,196 B1 | 8/2002 | Sethuraman et al. |
| 6,434,197 B1 * | 8/2002 | Wang et al. ............... 375/240.29 |
| 6,477,562 B2 | 11/2002 | Nemirovsky et al. |
| 6,532,593 B1 | 3/2003 | Moroney |
| 6,535,559 B2 | 3/2003 | Yagasaki et al. |
| 6,560,371 B1 | 5/2003 | Zhang et al. |
| 6,570,579 B1 * | 5/2003 | MacInnis et al. ............. 345/629 |
| 6,608,625 B1 | 8/2003 | Chin et al. |
| 6,618,507 B1 | 9/2003 | Divakaran et al. |
| 6,643,328 B2 | 11/2003 | Yagasaki et al. |
| 6,654,539 B1 | 11/2003 | Duruöz et al. .................. 386/68 |
| 6,658,157 B1 | 12/2003 | Satoh et al. |
| 6,671,322 B2 | 12/2003 | Vetro et al. |
| 6,671,454 B1 | 12/2003 | Kaneko et al. |
| 6,690,881 B1 | 2/2004 | Tomita et al. ................. 386/117 |
| 6,700,622 B2 | 3/2004 | Adams et al. |
| 6,735,253 B1 | 5/2004 | Chang et al. |
| 6,766,407 B1 | 7/2004 | Lisitsa et al. |
| 6,768,774 B1 | 7/2004 | MacInnis et al. |
| 6,847,778 B1 | 1/2005 | Vallone et al. |
| 6,876,703 B2 | 4/2005 | Ismaeil et al. |
| 6,909,749 B2 | 6/2005 | Yang et al. |
| 6,931,064 B2 | 8/2005 | Mori et al. |
| 6,996,838 B2 | 2/2006 | Rodriguez |
| 7,050,499 B2 | 5/2006 | Kodama et al. |
| 7,079,578 B2 | 7/2006 | Segev |
| 7,154,560 B1 | 12/2006 | Chang et al. |
| 7,233,622 B2 | 6/2007 | Winger et al. |
| 7,274,857 B2 | 9/2007 | Nallur et al. |
| 7,302,002 B2 | 11/2007 | Yagasaki et al. |
| 7,324,595 B2 | 1/2008 | Cote et al. |
| 7,356,082 B1 | 4/2008 | Kuhn |
| 7,391,809 B2 | 6/2008 | Li et al. |
| 2001/0014206 A1 | 8/2001 | Artigalas et al. ................ 386/83 |
| 2002/0039483 A1 | 4/2002 | Frost et al. |
| 2002/0044762 A1 | 4/2002 | Wood et al. |
| 2002/0071663 A1 | 6/2002 | O'Donnel |
| 2003/0001964 A1 | 1/2003 | Masukura et al. |
| 2003/0066084 A1 | 4/2003 | Kaars |
| 2003/0147631 A1 | 8/2003 | Zimmermann ................ 386/95 |
| 2003/0170003 A1 | 9/2003 | Levesque et al. |
| 2003/0233663 A1 | 12/2003 | Rao et al. |
| 2004/0055020 A1 | 3/2004 | Delpuch |
| 2004/0218680 A1 | 11/2004 | Rodriguez et al. |
| 2005/0074063 A1 | 4/2005 | Nair et al. |
| 2006/0013568 A1 | 1/2006 | Rodriguez |
| 2006/0093320 A1 | 5/2006 | Hallberg et al. |
| 2007/0286581 A1 | 12/2007 | Boston et al. |
| 2008/0037952 A1 | 2/2008 | Nallur et al. |
| 2008/0037957 A1 | 2/2008 | Nallur et al. |
| 2008/0253464 A1 | 10/2008 | Rodriguez et al. |
| 2008/0279284 A1 | 11/2008 | Rodriguez et al. |
| 2009/0033791 A1 | 2/2009 | Rodriguez et al. |

FOREIGN PATENT DOCUMENTS

| | | |
|---|---|---|
| EP | 1 161 089 A2 | 12/2001 |
| EP | 1 195 995 A2 | 4/2002 |
| JP | 5-49000 | 2/1993 |
| JP | 10-243344 | 10/1998 |
| JP | 10-271498 | 10/1998 |
| JP | 11-18063 | 1/1999 |
| JP | 11-196411 | 7/1999 |
| JP | 02-500851 | 1/2002 |
| JP | 03-087785 | 3/2003 |
| JP | 03-102008 | 4/2003 |
| WO | WO 96/10889 | 4/1996 |
| WO | WO 97/15149 | 4/1997 |
| WO | WO 99/12097 | 3/1999 |
| WO | WO 99/22517 | 5/1999 |
| WO | WO 01/13625 A1 | 2/2001 |
| WO | WO 02/43385 A2 | 5/2002 |

OTHER PUBLICATIONS

U.S. Final Office Action in U.S. Appl. No. 10/891,318 mailed Dec. 1, 2009.

EP Examination in 00 984 341.8 mailed Dec. 14, 2009.

Canadian Office Action in Application No. 2,472,244 mailed Apr. 3, 2008.

Canadian Office Action in Application No. 2,573,906 mailed Apr. 1, 2009.

EP Communication Pursuant to Article 94(3) EPC in 00 984 341.8 mailed May 19, 2009.

EP Communication Pursuant to Article 94(3) EPC in 02 794 331.5 mailed Jan. 12, 2009.

International Search Report in PCT/US00/33837 mailed Mar. 1, 2001.

International Search Report in PCT/US02/40828 mailed Apr. 21, 2003.

International Search Report and Written Opinion in PCT/US2004/030012 mailed Dec. 27, 2004.

International Search Report and Written Opinion in PCT/US2005/024706 mailed Oct. 18, 2005.

International Search Report and Written Opinion in PCT/US2008/070856 mailed Dec. 15, 2008.

Japanese Office Action in 2001-546180 mailed Mar. 30, 2007.

Japanese Office Action in 2001-546180 mailed Jun. 9, 2008.

Japanese Final Office Action in 2001-546180 mailed Jun. 18, 2009.

Richardson, I. et al., "Video codec complexity management," *Proc. International Picture Coding Symposium (PCS01)*, Seoul, Korea, 4 pages (Apr. 2001).

Topiwala, P., "Status of the emerging ITU-T/H.264 | ISO/MPEG-4, Part 10 Video coding standard," *Proceedings of SPIE*, vol. 4790, pp. 261-277 (Jul. 8, 2002).

Written Opinion in PCT/US00/33837 mailed Dec. 27, 2001.

Written Opinion in PCT/US02/40828 mailed Dec. 16, 2003.

U.S. Non-Final Office Action in U.S. Appl. No. 10/663,037 mailed Dec. 10, 2007.

U.S. Non-Final Office Action in U.S. Appl. No. 10/663,037 mailed Jun. 27, 2008.

U.S. Final Office Action in U.S. Appl. No. 10/663,037 mailed Dec. 10, 2008.

U.S. Non-Final Office Action in U.S. Appl. No. 10/663,037 mailed May 14, 2009.

U.S. Non-Final Office Action in U.S. Appl. No. 10/854,874 mailed May 13, 2008.

U.S. Non-Final Office Action in U.S. Appl. No. 10/854,874 mailed Dec. 15, 2008.
U.S. Final Office Action in U.S. Appl. No. 10/854,874 mailed Jun. 11, 2009.
U.S. Non-Final Office Action in U.S. Appl. No. 10/891,318 mailed Mar. 19, 2009.

U.S. Appl. No. 12/180,501, filed Jul. 25, 2008, entitled "Transcoding for Systems Operating Under Plural Video Coding Specifications," Inventors: Liang et al.
Japanese Final Office Action in 2006-526399 mailed Sep. 29, 2009.

* cited by examiner

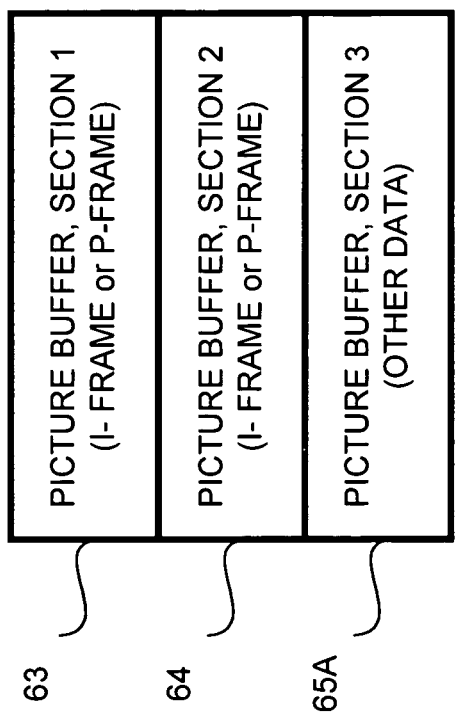

SYSTEMS AND METHODS FOR RESOURCE-ADAPTIVE PROCESSING OF SCALED VIDEO AND GRAPHICS

CROSS-REFERENCE TO RELATED APPLICATIONS

This application claims the benefit of U.S. Provisional Application No. 60/170,995, filed on Dec. 14, 1999, which is entirely incorporated herein by reference.

FIELD OF THE INVENTION

The present invention is generally related to managing resources, and more particularly related to decoding of compressed digital video under constrained resources.

BACKGROUND OF THE INVENTION

With recent advances in digital transmission technology, cable television systems are now capable of providing much more than the traditional analog broadcast video. In implementing enhanced programming, the home communication terminal ("HCT"), otherwise known as the settop box, has become an important computing device for accessing video services and navigating a subscriber or user through a maze of available services. In addition to supporting traditional analog broadcast video functionality, digital HCTs (or "DHCTs") now also support an increasing number of two-way digital services such as video-on-demand.

Typically, a DHCT is connected to a cable or satellite television network and includes hardware and software necessary to provide the functionality of the digital television system at the client's site. Preferably, some of the software executed by a DHCT is downloaded and/or updated via the cable television network. Each DHCT also typically includes a processor, communication components and memory, and is connected to a television or other display device, such as a personal computer. While many conventional DHCTs are stand-alone devices that are externally connected to a television, a DHCT and/or its functionality may be integrated into a television or personal computer, as will be appreciated by those of ordinary skill in the art. A DHCT typically receives compressed digital audio and video data and then decompresses it prior to presenting it to a user.

Video compression methods reduce the bandwidth and storage requirements of digital video signals in applications such as high-definition television, video-on-demand, and multimedia communications. Moreover, video compression is useful for transmission of broadcast, satellite, and cable television signals as evident in satellite up-link technology where multiple compressed digital video channels can be transmitted over one transponder instead of just one analog video channel.

Digital video compression methods work by exploiting data redundancy in a video sequence (i.e., a sequence of digitized pictures). There are two types of redundancies exploited in a video sequence, namely, spatial and temporal, as is the case in existing video coding standards. A description of these standards can be found in the following publications which are herein incorporated by reference: (1) ISO/IEC International Standard IS 11172-2, "Information technology—Coding of moving pictures and associated audio for digital storage media at up to about 1.5 Mbits/s—Part 2: video," 1993; (2) ITU-T Recommendation H.262 (1995): "Generic coding of moving pictures and associated audio: video," (ISO/IEC 13818-2); (3) ITU-T Recommendation H.261 (1993): "Video codec for audiovisual services at px64 kbits/s"; (4) Draft ITU-T Recommendation H.263 (1995): "Video codec for low bitrate communications."

One of the most important standards developed by the Moving Pictures Expert Group (MPEG) is the MPEG-2 standard. The video specification of MPEG-2 uses three predominant picture types: Intra frames (I frames), Predictive frames (P frames), and bi-directional frames (B frames). I frames are compressed by exploiting the internal spatial redundancy of each macroblock independently of reference pictures. The first picture of a picture sequence is an I frame. P frames are pictures in which macroblocks can be compressed by predicting their value from a past reference picture. A past reference picture is a picture, either an I or another P frame that is to be reconstructed and displayed prior to the current picture.

Information in past reference pictures is used to predict macroblocks in P or B frames. Each macroblock in a P frame potentially references a 16×16 pixel region in the reconstructed past reference picture. Thus a P frame demands more bus bandwidth to decompress than an I frame since the video decoder potentially needs to access data corresponding to a 16×16 pixel region or two 16×8 pixel regions from the reference picture stored in memory. P frames consume more memory to decompress than I frames since the past reference picture must be stored during decompression in memory.

If each macroblock in a 720×480 P frame is motion compensated and each pixel in memory is stored on average as 1.5 bytes, then at 30 pictures per second, the bus bandwidth requirement to retrieve 16×16 predictor blocks is 15,520,000 bytes per second. However, if each macroblock is encoded with two 16×8 block predictors, depending on the organization of data in memory, the bus bandwidth consumed is potentially doubled to 31,140,000 bytes per second. For PAL compressed pictures more bus bandwidth is consumed since the picture resolution is 720×576.

Macroblocks in B frames are eligible for compression in reference to both a past and a future reference picture. A future reference picture is a picture, either an I or a P frame, that is to be displayed after the current picture. I and P frames serve as reference pictures for motion compensation in B frames. One of the reference pictures is a past reference picture, the other is a future reference picture. The future reference picture is transmitted before the intermediate B frames can be decompressed and displayed by the video decoder. A future reference picture is decompressed and reconstructed prior to its targeted display time so that its information is available to the video decoder for the decompression of B frames. Consequently, pictures in MPEG-2 video are specified in the compressed video stream in the order that they require to be decompressed and reconstructed rather than on the order that they are to be displayed. One of the functions of a decompression and display device is to display pictures in their proper display order.

B frames consume more memory to decompress than P frames since a past and a future reference picture are stored during decompression in media memory. Each macroblock in a B frame potentially references two 16×16 or four 16×8 pixel regions in the reconstructed reference pictures. Thus a B frame demands more bus bandwidth to decompress than P and I frames since the video decoder potentially needs to access data corresponding to two 16×16 or four 16×8 pixel regions from the reference picture stored in media memory. B frames do not serve as reference pictures, so if they are not decompressed and reconstructed by the video decoder, the subsequent decoding of pictures is not affected.

If each macroblock in a 720×480 B frame is motion compensated, the bus bandwidth requirement to retrieve two 16×16 predictor blocks is 31,140,000 bytes per second. If each macroblock is encoded with four 16×8 block predictors, the bus bandwidth consumed is potentially doubled to 62,280,000 bytes per second. However, not all pictures in an MPEG-2 stream are B frames. For PAL compressed pictures more bus bandwidth is consumed since the picture resolution is 720×576. Each picture decompressed by the video decoder is written to a picture buffer in media memory. Thus, writing the reconstruction of each decompressed picture to memory consumes a bus bandwidth of 15,520,000 bytes per second.

Video decompression requires a relatively large amount of memory and use of other resources, and ample access to those resources must be budgeted. Therefore, consumer devices such as DHCTs that feature limited memory and limited bus bandwidth, for example, may not have capabilities to render other media, such as the generation and display of high resolution graphics, simultaneously with video, especially when the processing of the media in a DHCT impinges on the limited amount of memory and/or the budgeted bus bandwidth required for video processing. As a result, the generation and display of media graphics are often compromised. For example, an electronic program guide that is presented along-side a reduced video screen may have to be generated and stored in memory at a lower spatial resolution and/or lower color bit-depth since there may not be enough memory and/or bus bandwidth resources to accommodate video decompression as well as a high resolution graphics presentation. As a result, there is a need for a system and method for managing constrained resources in a more efficient and/or effective manner.

SUMMARY OF THE INVENTION

An embodiment of the present invention provides a system and method for adaptive video decoding. A method for adaptive video decoding includes determining whether a resource constrained mode is to be initiated, and responsive to a determination that the resource constrained mode is to be initiated, initiating the resource constrained mode, including foregoing the decoding of portions of received video input.

BRIEF DESCRIPTION OF THE DRAWINGS

Embodiments of the invention can be better understood with reference to the following drawings. The components in the drawings are not necessarily drawn to scale, emphasis instead being placed upon clearly illustrating the principles of the present invention. In the drawings, like reference numerals designate corresponding parts throughout the several views.

FIG. 5A is a block diagram depicting the contents of the picture buffer of the media memory depicted in FIG. 5, in accordance with an embodiment of the present invention.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
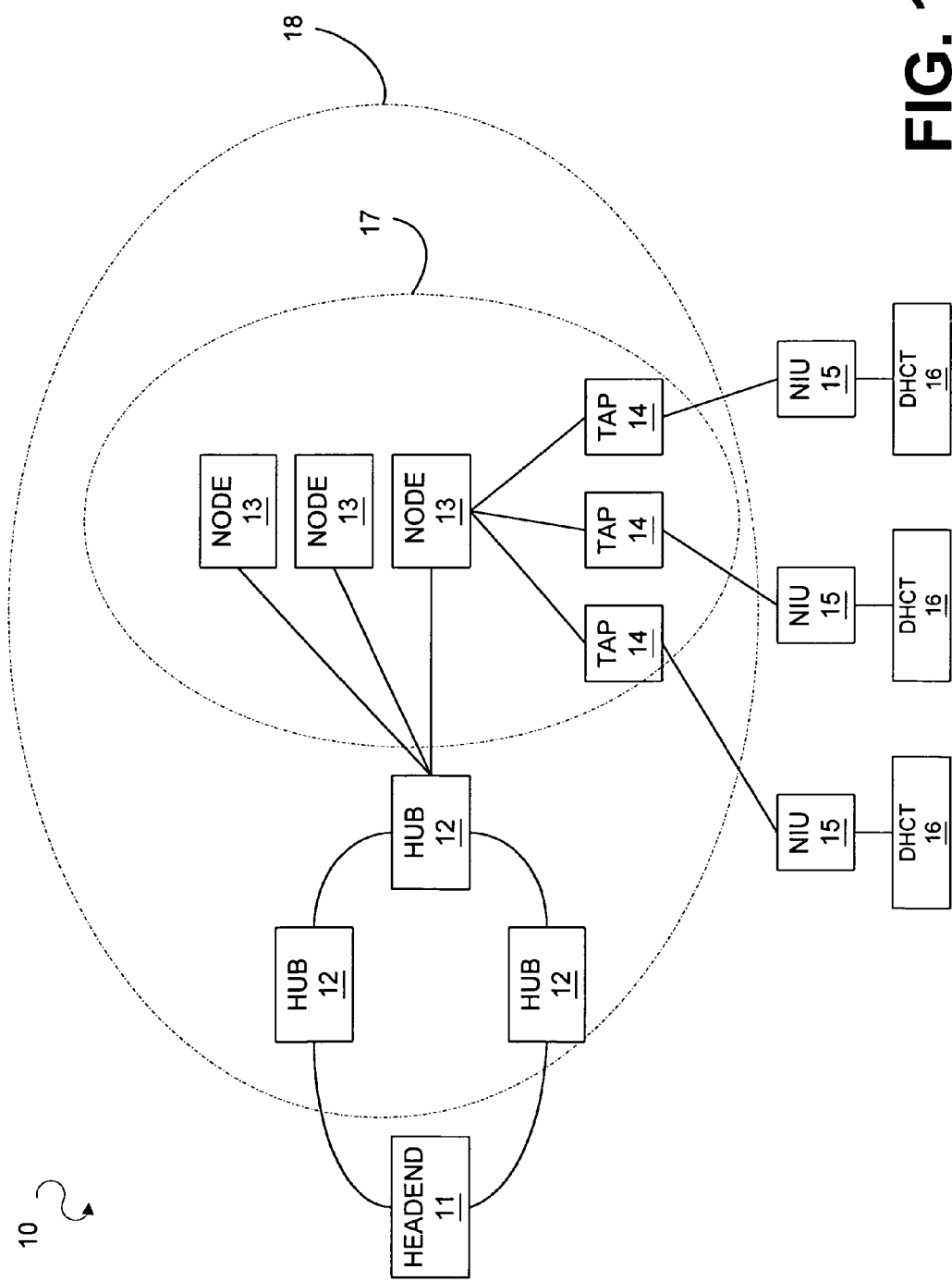
FIG. 1 is a block diagram of a cable television system in accordance with one preferred embodiment of the present invention.

The present invention is typically implemented as part of a cable television system (CTS). Hence, an illustrative CTS 10 and its operation will be described initially. FIG. 1 shows a block diagram view of a CTS 10, which is generally a high quality, reliable and integrated network system that features video, audio, voice and data services to DHCT users. Although FIG. 1 depicts a high level view of a CTS 10, it should be appreciated that a plurality of cable television systems can tie together a plurality of regional networks into an integrated global network so that DHCT users can receive content provided from anywhere in the world.

The CTS 10 delivers broadcast video signals as digitally formatted signals in addition to delivering traditional broadcast analog video signals. Furthermore, the system can support one way broadcast services as well as both one-way data services and two-way media and data services. The two-way operation of the network allows for user interactivity with services, such as Pay-Per-View programming, Near Video-On-Demand (NVOD) programming according to any of several known NVOD implementation methods, View-on-Demand (VOD) programming (according to any of several known VOD implementation methods), and interactive applications, such as Internet connections and interactive media Guide (IMG) applications.

The CTS 10 also provides the interfaces, network control, transport control, session control, and servers to access content and services, and distributes content and services to DHCT users. As shown in FIG. 1, a typical CTS 10 comprises a headend 11, hubs 12, an HFC access network 17, and users'digital home communication terminals (DHCTs) 16. It should be appreciated that although a single component (e.g. a headend) is illustrated in FIG. 1, a CTS 10 can feature a plurality of any one of the illustrated components or may be configured with alternative embodiments for any one of the individual components or with yet other additional components not enumerated above. A content provider (not shown) transmits media content to a headend for further transmission to users downstream in the network.

Content provided by a content provider is communicated by the content provider to one or more headends 11. From those headends the content is then communicated over a communications network 18 that includes a plurality of HFC access networks 17 (only one HFC access network 17 is illustrated). The HFC access network 17 typically comprises a plurality of HFC nodes 13, each of which may serve a local geographical area. The hub 12 connects to the HFC node 13 through a fiber portion of the HFC access network 17. The HFC node 13 is connected to a tap 14 which is connected to a network interface unit (NIU) 15 which is connected to a DHCT 16. The NIU 15 is normally located at a user's property and provides a transparent interface between the HFC node 13 and the users' internal wiring. Coaxial cables are typically used to couple nodes 13, taps 14 and NIUs 15 because the electrical signals can be easily repeated with radio frequency (RF) amplifiers.

As the high-level operations of many of the functions of CTSs 10 are well known to those of skill in the art, further description of the overall CTS 10 of FIG. 1 will not be contained herein. It will be appreciated, however, that the CTS 10 shown in FIG. 1 is merely illustrative and should not be construed as implying any limitations upon the scope of the present invention.

Figure 2:
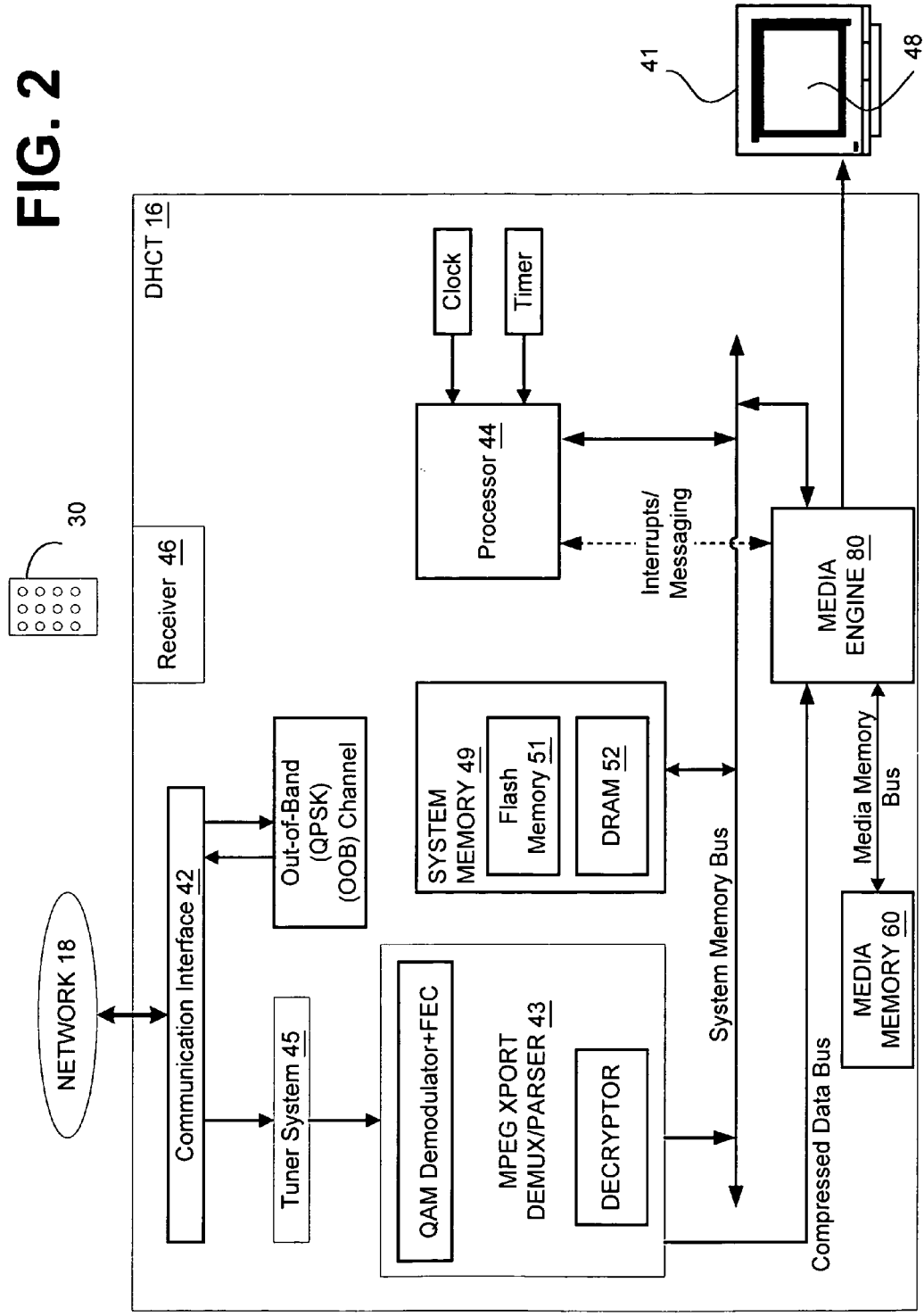
FIG. 2 is a block diagram of a DHCT and related equipment, in accordance with one preferred embodiment of the present invention depicted in FIG. 1.

FIG. 2 is a block diagram illustrating a DHCT 16 that is coupled to a headend 11 and to a television 41. Although embodiments of the invention are illustrated in the context of a DHCT, the principles of the invention apply to video decompression in other contexts, such as, for example, in hand held multimedia devices. Some of the functionality performed by applications executed in the DHCT 16 (such as the media on demand (MOD) client application 73) may instead be performed at the headend 11 and vice versa. A DHCT 16 is typically situated at a user's residence or place of business and may be a stand alone unit or integrated into another device such as, for example, a television set or a personal computer. The DHCT 16 preferably includes a communications interface 42 for receiving signals (video, audio and/or other data) from the headend 11 through the network 18 and for providing any reverse information to the headend 11 through the network 18, as well as demultiplexing system 43 comprising functionality for QAM demodulation, forward error correction (FEC), transport demultiplexing and parsing, and decryption (if necessary). The DHCT 16 further includes at least one processor 44 for controlling operations of the DHCT 16, a media engine 80 for driving the television display 48, and a tuner system 45 for tuning into a particular television channel to be displayed and for sending and receiving various types of data or media from the headend 11. The tuner system 45 includes, in one implementation, an out-of-band tuner for bi-directional quadrature phase shift keying (QPSK) data communication and a quadrature amplitude modulation (QAM) tuner for receiving television signals. Additionally, a receiver 46 receives externally-generated information, such as user inputs or commands from other devices.

The DHCT 16 may also include one or more wireless or wired interfaces, also called ports, for receiving and/or transmitting data to other devices. For instance, the DHCT 16 may feature USB (Universal Serial Bus), Ethernet (for connection to a computer), IEEE-1394 (for connection to media devices in an entertainment center), serial, and/or parallel ports. The user inputs may, for example, be provided by a computer or transmitter with buttons or keys located either on the exterior of the terminal or by a hand-held remote control device or keyboard that includes user-actuated buttons.

Figure 3:
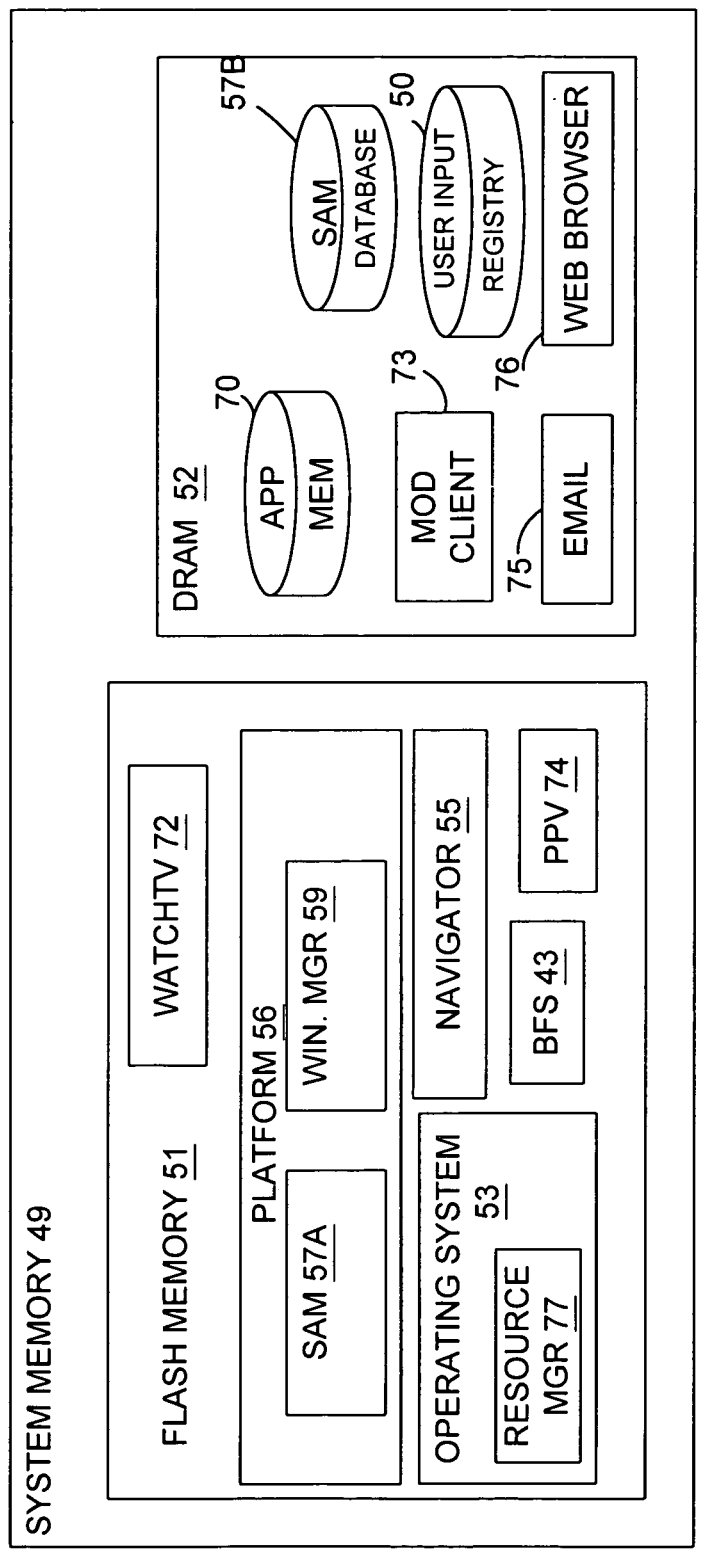
FIG. 3 is a block diagram depicting system memory contents of the DHCT depicted in FIG. 2.

FIG. 3 is a block diagram illustrating selected components stored in system memory 49. In one implementation, system memory 49 includes flash memory 51 and dynamic random access memory (DRAM) 52 for storing various applications, modules and data for execution and use by the processor 44. Basic functionality of the DHCT 16 is provided by an operating system 53 that is primarily stored in flash memory 51. Among other things, the operating system 53 includes at least one resource manager 77 that provides an interface to and coordination of resources of the DHCT 16 such as, for example, computing resources.

One or more programmed software applications, herein referred to as applications, are executed by utilizing the computing resources in the DHCT 16. Applications stored in flash memory 51 or DRAM 52 are executed by processor 44 (e.g., a central processing unit or digital signal processor) under the auspices of the operating system 53. Data required as input by an application is stored in DRAM 52 or flash memory 51 and read by processor 44 as need be during the course of the application's execution. Input data may be data stored in DRAM 52 by a secondary application or other source, either internal or external to the DHCT 16, or possibly anticipated by the application and thus created with the application at the time it was generated as a software application, in which case it is stored in flash memory 51. Data generated by an application is stored in DRAM 52 by processor 44 during the course of the application's execution. DRAM 52 also includes application memory 70 that various applications may use for storing and/or retrieving data.

An application referred to as navigator 55 is also resident in flash memory 51 for providing a navigation framework for services provided by the DHCT 16. The navigator 55 registers for and in some cases reserves certain user inputs related to navigational keys such as channel increment/decrement, last channel, favorite channel, etc. The client applications may be resident in flash memory 51 or downloaded into DRAM 52. The navigator 55 also provides users with television related menu options that correspond to DHCT functions such as, for example, providing an interactive program guide, blocking a channel or a group of channels from being displayed in a channel menu, and displaying a video-on-demand purchase list.

The flash memory 51 also contains a platform library 56. The platform library 56 is a collection of utilities useful to applications, such as a timer manager, a compression manager, a configuration manager, an HTML parser, a database manager, a widget toolkit, a string manager, and other utilities (not shown). These utilities are accessed by applications via application programming interfaces (APIs) as necessary so that each application does not have to contain these utilities. Two components of the platform library 56 that are shown in FIG. 3 are a window manager 59 and a service application manager client (SAM) 57A.

The window manager 59 provides a mechanism for implementing the sharing of the screen regions and user input. The window manager 59 is also responsible for, as directed by one or more applications, implementing the creation, display, and allocation of the limited DHCT 16 screen resources. Window manager 59 allows multiple applications to share the screen by assigning ownership of screen regions, or windows. Window manager 59 communicates with resource manager 77 to coordinate available resources (such as display memory) among different resource-consuming processes. Such processes may be directly or indirectly invoked by one or more applications. The window manager 59 also maintains, among other things, a user input registry 50 in DRAM 52 so that when a user enters a key or a command via the remote control device 80 or another input device such as a keyboard or mouse, the user input registry 50 is accessed to determine which of various applications running on the DHCT 16 should receive data corresponding to the input key and in which order. As an application is executed, it registers a request to receive certain user input keys or commands. When the user presses a key corresponding to one of the commands on the remote control device 80, the command is received by the receiver 46 and relayed to the processor 44. The processor 44 dispatches the event to the operating system 53 where it is forwarded to the window manager 59 which ultimately accesses the user input registry 50 and routes data corresponding to the incoming command to the appropriate application.

The SAM client 57A is a client component of a client-server pair of components, with the server component being located on the headend 11. A SAM database 57B in DRAM 52 includes a data structure of services and a data structure of channels that are created and updated by the headend 11. Many services can be defined using the same application component, with different parameters. Examples of services include, without limitation and in accordance with one implementation, presenting television programs (available through a Watch TV application 72), pay-per-view events (available through a PPV application 74), digital music (not shown), media-on-demand (available through an MOD application 73), and an interactive program guide. In general, the identification of a service includes the identification of an executable application that provides the service along with a set of application-dependent parameters that indicate to the application the service to be provided. As a non-limiting example, a service of presenting a television program could be executed with a set of parameters to view HBO or with a separate set of parameters to view CNN. Each association of the application component (tune video) and one parameter component (HBO or CNN) represents a particular service that has a unique service I.D. The SAM client 57A also interfaces with the resource manager 77, as discussed below, to control resources of the DHCT 16.

Application clients can also be downloaded into DRAM 52 at the request of the SAM client 57A, typically in response to a request by the user or in response to a message from the headend. In this non-limiting example DRAM 52 contains a media-on-demand application (MOD) 73, an e-mail application 75, and a web browser application 76, among others (not shown). It should be clear to one with ordinary skill in the art that these applications are not limiting and merely serve as examples for this present embodiment of the invention. Furthermore, one or more DRAM based applications may, as an alternative embodiment, be resident in flash memory 51. These applications, and others provided by the cable system operator, are top level software entities on the network for providing services to the user.

In one implementation, applications executing on the DHCT 16 work with the navigator 55 by abiding by several guidelines. First, an application utilizes the SAM client 57A for the provision, activation, and suspension of services. Second, an application shares DHCT 16 resources with other applications and abides by the resource management policies of the SAM client 57A, the operating system 53, and the DHCT 16. Third, an application handles situations where resources are only available with navigator 55 intervention. Fourth, when an application loses service authorization while providing a service, the application suspends the service via the SAM (the navigator 55 will reactivate an individual service application when it later becomes authorized). Finally, an application client is designed to not have access to certain user input keys reserved by the navigator (i.e., power, channel +/−, volume +/−, etc.).

An executable program or algorithm corresponding to an operating system (OS) component, or to a client platform component, or to a client application, or to respective parts thereof, can reside in and execute out of DRAM 52 and/or flash memory 51. Likewise, data inputted into or outputted from any executable program can reside in DRAM 52 or flash memory 51. Furthermore, an executable program or algorithm corresponding to an OS component, or to a client platform component, or to a client application, or to respective parts thereof, can reside in flash memory 51, or in a local storage device connected to DHCT 16 and be transferred into DRAM 52 for execution. Likewise, data input for executable program can reside in flash memory 51 or a storage device and be transferred into DRAM 52 for use by an executable program or algorithm. In addition, data outputted by an executable an program can be written into DRAM 52 by an executable program or algorithm and be transferred into flash memory 51 or into a storage device for storage purposes. The present invention is not limited by where or how data and/or applications are stored or retrieved.

Each of the above mentioned applications comprises executable instructions for implementing logical functions and can be embodied in any computer-readable medium for use by or in connection with an instruction execution system, apparatus, or device, such as a computer-based system, processor-containing system, or other system that can fetch and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner, and then stored in a computer memory.

Figure 4:
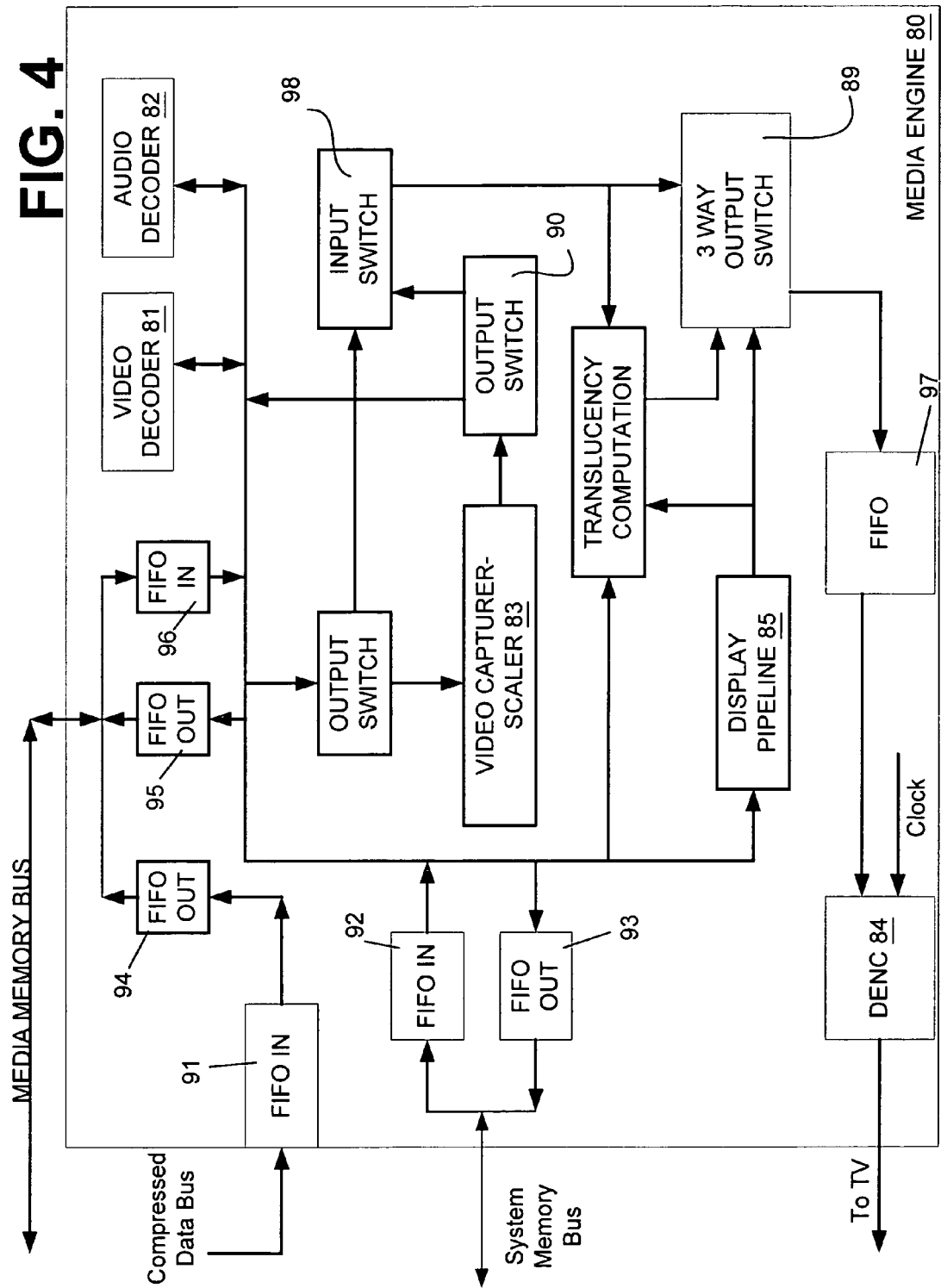
FIG. 4 is a block diagram of a media engine of the DHCT depicted in FIG. 2, in accordance with an embodiment of the present invention, including data flow and interconnections.

FIG. 4 depicts a block diagram of selected components of media engine 80 according to one embodiment of the present invention. In one embodiment, the media engine 80 is an application specific integrated circuit (ASIC). The media engine 80 includes a video decoder 81 for decoding compressed digital video and an audio decoder 82 for decoding compressed digital audio associated with the digital video. The media engine 80 also includes a block transfer engine (not shown), herein referred to as a blitter, for transferring graphical and textual data from system memory 49 to media memory 60; a video capturer-scaler 83 for resizing video pictures; and a programmable memory controller (not shown), also referred to as media controller, for controlling access to the media memory 60. In one embodiment, an embedded RISC processor (not shown) or similar circuitry is housed in the media engine 80 and is coupled to the memory controller. The embedded RISC processor would serve to feature part of the programmability in the media engine 80, to control various components in the media engine 80, and to effect coordinated communication and control with processor 44, such as by servicing and generating interrupts.

The memory controller is programmed to fulfill a pre-assigned prioritization scheme that assigns priority to each functional component or process that accesses the media memory 60 and therefore indirectly controls the bus bandwidth entitlement to each media-producing or media-consuming operation. In order to fulfill a request by a higher-priority operation, the memory controller pre-empts a lower-priority data transfer operation at an interval that permits graceful postponement and resumption.

In one embodiment, in effecting all functionality such as access and entitlements to media memory 60, the memory controller in media engine 80 operates under a fixed priority scheme as predetermined and programmed into media engine 80. Some of the functional components that consume media memory bus bandwidth are capable of performing one or more types of operations that may have different assigned priorities. For instance, the blitter is capable of transferring data from one section of media memory 60 to another section of media memory 60 or from media memory 60 to system memory 49. These two types of blitter operations may, for example, be pre-assigned lower priority than a blitter data transfer operation from system memory 49 to media memory 60.

Preferably, depending on the operation being performed, the media engine 80 will operate in one of a number of different states, either a constrained state or one from a set of possible constrained states. In some embodiments, in effecting all functionality such as access and entitlements to media memory 60, the memory controller in media engine 80 operates under a programmed priority scheme that was predetermined and programmed into media engine 80 for that particular state.

In a preferred embodiment, the functional components that consume media memory bus bandwidth include: the video decoder 81, the audio decoder 82, the blitter, the video capturer-scaler 83, a video digital encoder 84 (DENC), one or more component video digital-to-analog converters (DACs, not shown), one or more audio DACs (not shown), the processor 44, an embedded RISC processor or similar circuitry housed in the media engine 80, and the media controller. The media controller and RISC processor typically consume negligible bus bandwidth but indirectly fulfill memory-to-memory data transfer operations by servicing first-in-first-out buffers (FIFOs) 91-97 inside the media engine 80. The FIFOs 91-97 serve as intermediate repositories for data transfers, facilitating burst data transfers and coordination of bus access timing.

The DENC 84 converts reconstructed video data received at its input to an analog video signal that drives the TV display 48. The process of feeding the reconstructed picture data from media memory 60 to a DENC 84 is a media-consuming operation; it is typically assigned high (if not highest) priority access to the media memory 60 to avoid flicker on the TV display 48. Likewise, the audio DAC (Digital-to-Analog Converter) and all media-consuming operations are typically assigned high priority.

The media engine 80 feeds data to the DENC 84 from media memory 60 to produce a raster scan of displayed pixels consistent with the type of television connected to the DHCT 16. For an NTSC Display, the DENC 84 receives 60 fields per second; each field represents one of the two sets of alternating lines in each picture. According to the MPEG-2 standard's "Main Profile/Main Level," the DENC 84 can receive the equivalent of up to 30 pictures per second, each picture with spatial resolution equal to 720×480 pixels, with each pixel requiring an average of 1.5 bytes. Thus maintaining the TV display 48 refreshed results in bus bandwidth consumption of 15,520,000 bytes per second.

Figure 5:
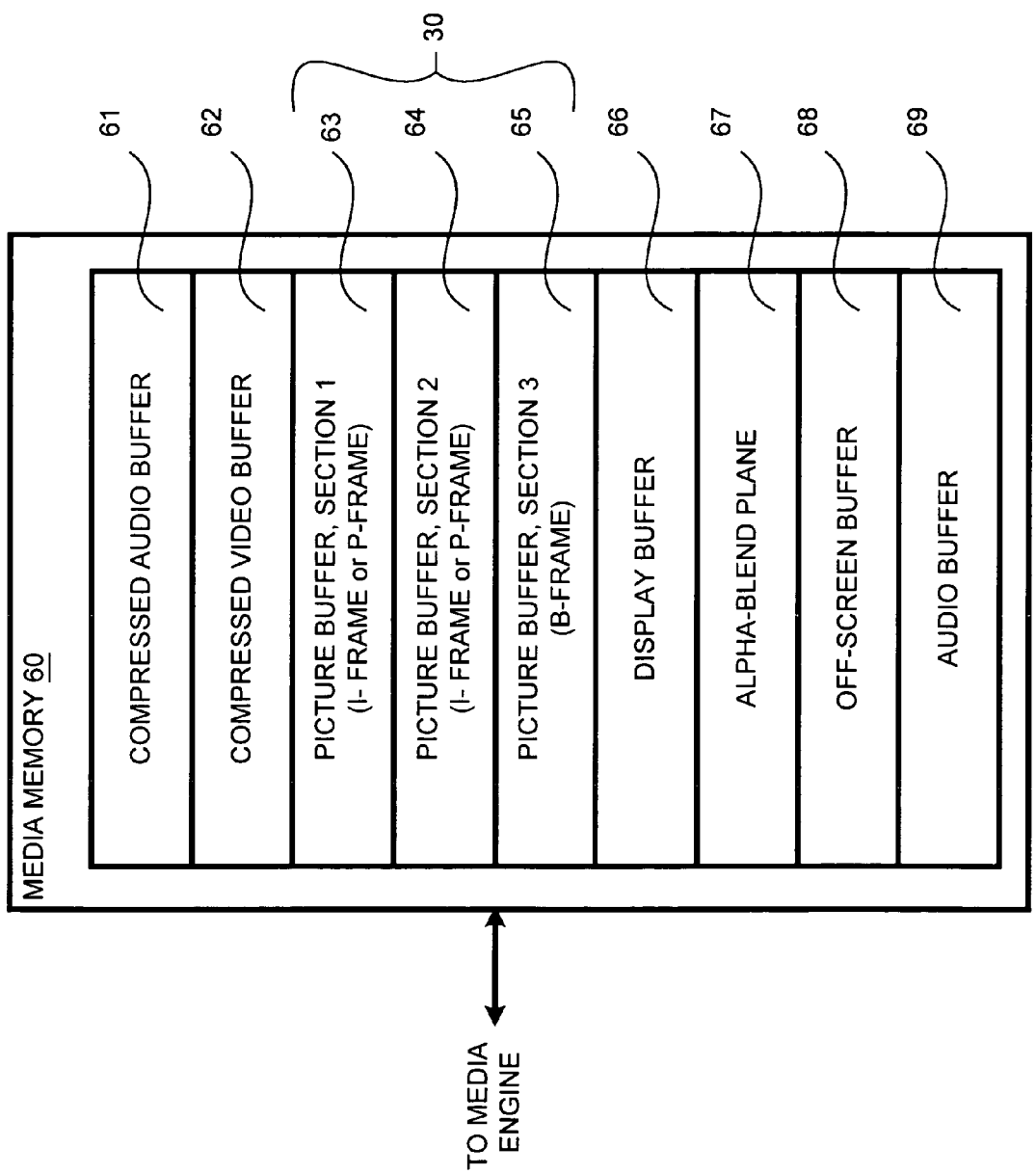
FIG. 5 is a block diagram depicting media memory contents of the DHCT depicted in FIG. 2.

FIG. 5 is a block diagram of media memory, a computing resource having finite size (and thus bound in storage capacity), and serving as a repository for different data components. Compressed MPEG-2 video streams are deposited in a section of media memory 60 allocated as a compressed video buffer 62. Likewise, compressed digital audio streams are deposited in respective compressed audio buffer (CAB) 61. The audio buffer (AB) 69 stores decompressed audio that is fed into the audio DACs. A picture buffer 30 consists of three sections 63-65 of media memory 60, each having a capacity equal to the number of bytes in a reconstructed MPEG-2 Picture. One section stores a past reference picture (such as an I frame), a second section stores a future reference picture (such as a P frame) and a third section stores the current picture being decompressed (such as a B frame).

A display buffer 66 serves as a repository for graphical and textual objects produced by the processor 44 and for down-scaled digital video pictures. The content of the display buffer 66 (also referred to as the graphics overlay) is overlaid on top of the video picture when activated. An alpha-blend-plane serves as a buffer for storing spatially corresponding information to the graphics overlay. A pixel value in the alpha-blend-plane indicates (according to an alpha value) the extent to which a visible pixel in the display buffer 66 is opaque. In other words, the values in an alpha-blend-plane determine the extent to which a graphics overlay is translucent. For example, the alpha-blend-plane may contain values corresponding to a graphics overlay containing a broadcasting company's logo, wherein high alpha values would cause the logo to appear opaque and intermediate alpha values would cause the logo to appear translucent.

In feeding the DENC, the media engine processes input data from media memory's display buffer 66 and picture buffer 30 according to information retained in the display buffer 66 and the alpha-blend plane 67. Both, data from the display buffer 66 and from the picture buffer 30 are stored in temporary repository memory such as line buffers (not shown) or FIFOs (not shown) inside media engine 80 to effect readily-available data at the input of 3-way output switch 89, at the clocked pixel rate required for display. The alpha-blend plane 67 is likewise read and stored in temporary repository memory inside media engine 80 so that it is readily-available. If the pixel value in the display buffer 66 denotes a transparent graphics pixel, the 3-way output switch 89 is set accordingly to propagate to its output a first input corresponding to a video pixel and the pixel displayed is pure video as read from the picture buffer 30; else, a graphics pixel is caused to propagate through the 3-way output switch 89 and to be displayed in accordance with the corresponding spatial value in the alpha-blend-plane. If the pixel in the alpha-blend-plane denotes a value for opaque graphics, the 3-way output switch 89 is set accordingly to propagate to its output a second input corresponding to a graphics pixel and the pixel displayed is as read from the display buffer; else, a translucent pixel value is computed immediately prior to arriving to the a third input of the 3-way output switch 89 in the display pipeline 85. Such computation is a weighted-average of the values of the spatially corresponding graphics and video pixels according to an alpha value stored in the corresponding location of the alpha-blend-plane. The color depth and spatial resolution employed for the graphics overlay affect the number of bytes and bus bandwidth consumed by the display buffer and alpha-blend-plane.

In alternative embodiments, the alpha-blend plane 67 does not exist as an independent entity but is part of the formatted specification of each pixel in the graphics information. Thus pixels comprising a graphics overlay in the offscreen buffer 68 and display buffer 66 would contain their respective alpha-blend value.

In alternative embodiments, either the video DENC 84 or audio DAC, or both, may be "external to" or "housed within" the media engine 80. In other embodiments, there are multiple sets of video DENC 84s and audio DACs wherein each set is fed reconstructed digital media corresponding to different MPEG-2 programs. Furthermore, any of the aforementioned functional components may either be located within or outside to media engine 80.

The video decoder 81 is assigned higher priority access to media memory 60 than any data transfer operation from system memory 49 to media memory 60. Consequently, graphical and textual objects produced by the processor 44 are subject to limited bus bandwidth to media memory 60 under tight bus bandwidth conditions and limited memory allocation. Furthermore, according to the memory limits of DHCTs 16, the color-depth and spatial resolution of the graphics overlay are constrained; the latter to a proportional horizontal and vertical dimension of the video picture resolution. Consequently, the video decoder 81 of this invention operates in one of two states: a non-constrained-resource-state, and a constrained-resource-state. In one embodiment, the memory controller in media engine 80 operates under a fixed priority scheme as predetermined and programmed into media engine 80 regardless of the resource state. In the non-constrained-resource-state, the high priority access to resources assigned to the video decoder 81 results in non-compromised picture quality, full-scale video picture and full picture rate, but the graphics overlay is potentially compromised. The graphics overlay is maintained with reduced spatial resolution and/or color depth but expanded to the video picture resolution on the way to the DENC 84 in a Display pipeline 85 circuit in the media engine 80. This results in reduced number of bytes and bus bandwidth consumed by operations that access the display buffer 66 and alpha-blend-plane. The expansion of the graphics overlay's resolution is achieved by a Horizontal Picture Scaling Circuit (HPSC) 87 and a Vertical Scaling Picture Circuit (VPSC) 86, both located within the Display pipeline 85. Line buffers inside the display pipeline 85 or elsewhere in the media engine 80 serve as temporary repository memory to effect the scaling operations.

There are multiple levels of constrained resources. Some scenarios exhibit limits on memory and bus bandwidth while others only exhibit memory limitations; and yet others only exhibit bus bandwidth limitations.

A "memory" constrained-resource state results in the video decoder 81 consuming less memory. For decompression of a compressed MPEG-2 video, memory reduction may result from eliminating decompression and reconstruction of B frames completely. This facilitates having to maintain a picture buffer with two rather than three sections in media memory 60; one section is used to store the past reference picture and the second to reconstruct the picture being decoded. Thus, the video decoder 81 decompresses only the I and P frames when it does not have sufficient memory to store all of the reference pictures. A decompression frame sequence could potentially be: $F_1, F_4, F_7, F_{10} F_{13}, \ldots F_k$. The interspersed compressed B frames can be skipped because they do not serve as reference pictures. A preceding reference frame may be displayed in place of a skipped B frame such that a displayed frame sequence may be: $F_1, F_1, F_1, F_4 F_4, F_4, F_7, F_7, F_7, F_{10}, F_{10}, F_{10}, \ldots F_k$. The memory resources freed up by foregoing decompression of B frames may then be allocated for storing other data such as graphical or text data as illustrated in FIG. 4B.

External operations (e.g., by a processor 44) deposit the compressed MPEG-2 video stream and compressed audio streams respectively into the compressed video buffer 62 (CVB) and compressed audio buffers 61 (CAB) located in media memory 60. The CVB 62 and CAB 61 are circular buffer entities filled by external operations and consumed respectively by the video decoder 81 and audio decoder 82. Each compressed MPEG-2 video picture in the CVB 62 is specified compliant to the MPEG-2 video syntax and semantics rules. Information specified according to the MPEG-2 video stream syntax at the picture level of each compressed picture is read by the video decoder 81, even when a picture's decompression is to be skipped over. For instance, information specified within the picture header and the picture coding extension is interpreted for each picture. In this manner, the video decoder 81 determines the number of bytes to jump to in the CVB 62 to find the start of the next compressed video picture. Other pertinent information in the picture level specification of each picture is also interpreted as necessary during video decoder 81 operations.

In a "memory and bus bandwidth" constrained-resource state and "memory" constrained-resource state, the video decoder 81 produces video pictures at lower rates whereas the graphics overlay is maintained with a higher spatial resolution and/or color depth that result in consumption of a higher number of bytes (e.g., four times as much) and bus bandwidth. The video decoder 81 foregoes the decompression and reconstruction of the B frames. The video decoder 81 relinquishes the section of the picture buffer used to retain the B frame, which then becomes assigned in whole, or in part, for the benefit of the graphics overlay and alpha-blend-plane as illustrated in FIG. 4B. As a result, either the graphics overlay or the alpha-blend-plane, or both, are represented in memory with a higher spatial resolution and/or color-depth. Furthermore, the bus bandwidth that would have been consumed in decompressing and reconstructing the B frames is aggregated for the benefit of operations producing or consuming graphical and textual objects.

Although in both of these types of constrained-resource state, the picture can be displayed in its original spatial resolution, the most common cause instigating a resource-constrained state is applications that display a downscaled video picture that appears as an embedded picture in a graphical color screen. In essence, viewer interaction causes the display to enter a computer-like media presentation. Once the constrained-resource-state is invoked, the video decoder 81 adapts to constraints on memory and bus bandwidth, reducing its consumption as necessary as imposed by the need to concurrently display graphical and textual objects. Adaptation is not fixed but dynamically adjusted. As will become evident herein, the novel system adapts by reducing the video decoder 81's memory requirements to decode compressed digital video, and/or by decoding compressed digital video pictures according to the bus bandwidth requirements of the other media-producing operations. In a preferred embodiment, the video decoder 81 decompresses MPEG-2 video streams that were compressed by an MPEG-2 video Encoder that encoded the streams without any consideration to the possibility of subsequent reduction in the picture rate and/or the spatial resolution of images in the streams.

Since cost-effective multimedia systems have limited resources, by alternating between the two resource-allocation states, the system of the preferred invention offers a balance between video picture quality and quality of graphics and textual objects. Full-scale, full-rate picture playback with potentially (i.e., not necessarily) compromised graphics quality is provided during passive television viewing. Thus, the video picture during passive television-centric viewing periods is not degraded. But when a viewer initiates interaction with the DHCT 16 that demands the display of a composition of a downscaled picture resolution with graphics and textual objects, the viewer is exposed to a more computer-centric interactive experience in which picture degradation is acceptable and often customary.

Noteworthy is that the novel method maps consistently with the capabilities of the human visual system. In the constrained-resource-state, the downscaled video picture continues to be displayed as a motion picture while some of the displayed graphical and textual objects tend to remain stationary for longer periods of time. Hence, the artifacts on graphical and textual objects tend to be more discernable. In addition, the human visual system has less acuity on the downscaled video than on the original picture resolution so it tends to be less discerning of picture artifacts. The human visual system also tends to be less discerning of image artifacts in motion pictures because of the integration of information sensed at the retina is a finite time interval and replenished with new information according to the moving picture rate.

A host interface in the media engine 80 serves as an interface to the processor 44. It is through the host interface that communication and coordination between the media engine 80 and processor 44 is conducted. In addition to the typical data and address buses that connect processor 44, media engine 80 and system memory 49, the host interface contains physical interrupt lines and/or internal addressable registers that can be polled periodically by an embedded RISC processor or similar circuitry housed in media engine 80. The processor 44 is also signaled by the media engine 80 through physical interrupt lines and/or read-write message registers.

The Processor 44 generates graphical and textual objects and stores them in system memory 49. The textual and graphical object may for example be generated through the execution of an electronic program guide (EPG) application for the purpose of presenting a user with an EPG window. The processor 44 then notifies the media engine 80 through the host interface of pending data to be transferred to media memory 60. In one embodiment of this invention, the processor 44 uses a DMA (direct memory access) channel to transfer the objects to media memory 60 upon an access entitlement by media engine 80's memory controller.

The processor 44 runs an operating system capable of multi-tasking, task scheduling and switching. In a preferred embodiment, the processor 44 runs a pre-emptive real-time operating system. The processor 44 can be notified by media engine 80 via interrupts or messages written to registers when processor 44 is entitled access to media memory 60. A background task is executed to poll messages on a periodic basis. If processor 44 has generated objects that are ready to be sent to media memory 60, once it receives an access entitlement, under the auspices of the real-time operating system, the processor 44 postpones a current task in order to transfer the objects from system memory 49 to media memory 60. Small sets of contiguous memory locations are read rapidly from system memory 49 and stored in first-in-first-out memory (FIFO) 92 and 95 in the media engine 80. Media engine 80 transfers FIFO content to a designated area of display buffer 66 in media memory 60. As data written to the FIFO is transferred to media memory 60 from FIFO 95, the processor 44 initiates the next burst transfer into the FIFO 92. The process is repeated until all data corresponding to the objects is transferred. Through this transfer process, the media engine 80 and processor 44 can coordinate the transfer of objects from system memory 49 into the display buffer 66 in the media memory 60 so that if necessary, the data transfer occurs during the time when the video decoder 81 refrains from decoding B frames.

FIFOs 92 and 95 effect as a double bank repository of storage to effect a transparent data transfer when system memory data bus and media memory data bus run off two distinct clocks. In an alternate embodiment, FIFOs 92 and 95 may comprise a single contiguous physical FIFO in which both system memory bus and media memory bus run off the same clock.

In another embodiment of this invention, when the processor 44 notifies media engine 80 via interrupts or messages that objects are ready to be transferred from system memory 49 to media memory 60, the media engine 80 employs the blitter to transfer the objects. Immediately prior to initiating the data transfer operation, the media engine 80 notifies the processor 44 that the blitter operation is executing. The processor 44's access to system memory 49 is awarded lower priority during the blitter transfer. Alternatively, processor 44 refrains from accessing system memory 49 until future communication from media engine 80 indicates that the data transfer has been completed. Noteworthy is that the prioritization of access to system memory 49 is not to be confused with the programmed fixed prioritization scheme exercised by the memory controller in media engine 80 for access to media memory 60. Thus the media engine 80 takes higher precedence over system memory 49 access during blitter data transfers from system memory 49 to media memory 60. The blitter reads small sets of contiguous system memory 49 locations rapidly and stores them in media engine 80's FIFOs 92 and 95. The FIFO's content is written to the designated area of the display buffer 66 in media memory 60 while the FIFO is replenished with data read from system memory 49. This operation continues until all data corresponding to the objects is transferred. When the blitter operation terminates, the media engine 80 notifies processor 44 to re-establish its higher priority access to system memory 49.

The memory controller grants access to data transfers from system memory 49 to the display buffer 66 in media memory 60 in a timely way that safeguards from generating tear artifacts on the TV display 48. Data transfer is granted to locations in the display buffer 66 corresponding to raster-scan ordered data already fed from display buffer 66 into the DENC 84. In other words, data written to the display buffer 66 is always behind (in raster-scan order) the display buffer 66 locations read and fed into the DENC 84. Alternatively, data can be written to a secondary display buffer 66, often called an off-screen buffer 68. However, this approach consumes additional media memory 60 and further limits the video decoder 81's resources. The off-screen buffer 68, or parts thereof, are then transferred to the display buffer 66 using the blitter during suitable times (e.g., during the vertical blanking video interval). Or the off-screen buffer 68 and display buffer 66 can alternate their functions under program control, thereby conserving bus bandwidth. Thus once the offscreen buffer 68 has been written with all data and objects that comprise a display buffer 66 update, the offscreen buffer becomes the display buffer and vice-versa. The memory controller uses a pointer that points to the beginning of the display buffer 66 and another pointer that points to the beginning of the off-screen buffer 68. Both pointers are stored either in memory or in special registers in the media engine 80. Therefore, to alternate the functions of the display buffer 66 and the off-screen buffer 68, the content of the two pointer repositories are swapped under program control.

Graphics and textual objects are transferred from system memory 49 to media memory 60 during the intervals when the video decoder 81 is not decoding a video picture. A period of not decoding video pictures may consist of foregoing the decompression of one or more compressed video pictures residing in compressed format in the compressed video buffer 62 in media memory 60. Thus, the communication and coordination between media engine 80 and processor 44 enables better use of bus bandwidth during periods wherein pictures are skipped.

Communication aimed at transferring data from system memory 49 to media memory 60 requires specifying the data to be transferred, including the number of data objects and total number of bytes, $G_T$, to be transferred. Each object occupies a rectangular region to be copied within the confines of the display buffer 66 in media memory 60. Thus, an object specification includes the location of the top-left pixel of a rectangle in relation to the top-left pixel of the graphics overlay, the number of bytes in each horizontal line of the rectangle, and the number of lines in the rectangle.

FIG. 5A is a block diagram that depicts memory space 65A being relinquished through the suspension of B frame decompression and reconstruction. Skipping over B frame decompression results in memory space 65A becoming available for storing other data such as graphical or text data corresponding to an EPG screen. Skipping over a B frame may be caused by the need for bus bandwidth, additional memory, or both. The media engine 80 determines the number of B frames that the video decoder 81 should skip (i.e., not decompress and reconstruct) based on the following factors: the number of bytes, $G_T$, specified to effectuate a transfer from system memory 49 to media memory 60, the number of consecutive B frames interspersed between reference pictures, and the bus bandwidth, $BB_{REQ}$, required by video decoder 81 to decompress and reconstruct the MPEG-2 B frame of spatial resolution $B_{SIZE}$. The estimated bus bandwidth required for decompressing a B frame may be based on worst-case estimate of decompression complexity (i.e., each macroblock in the B frame requires bi-directional motion compensation) or on a realistic but conservative and thus safe estimate for that particular picture size as predetermined empirically.

In a preferred embodiment, the number of B frames to skip over, $N_{SKIP}$, is computed a priori and stored in a Look-Up Table (LUT) for different combinations of $G_T$ and $BB_{REQ}$ stepped values. Since in almost all MPEG-2 video streams the number of consecutive B frames interspersed between reference pictures is two or three, two LUTs are employed respectively. Intermediate $G_T$ and $BB_{REQ}$ values are rounded to the safest stepped-value for indexing the LUT such that $N_{SKIP}$ values provide ample bus bandwidth for transferring objects into media memory 60. Different $B_{SIZE}$ values can result in different sets of LUTS. For instance, a LUT or set of LUTs may be tailored for NTSC compressed MPEG-2 streams whereas another LUT or set of LUTs may be customized for PAL compressed video.

In an alternate embodiment, $BB_{REQ}$ is continually computed and updated based on the video decoder 81's bus bandwidth consumption history while decompressing B frames. Alternatively bus bandwidth consumption may be estimated a priori based on scheduled program content for each television channel at different times (this approach is useful for periodic broadcast television programs). Another alternative is to transmit the required bus bandwidth information periodically in the MPEG-2 Transport Stream as private data in compliance to the MPEG-2 video stream syntax. And yet another alternative is to transmit the required bus bandwidth information periodically as user data within each respective B frame in compliance to the MPEG-2 video stream syntax. For example, the amount of bus bandwidth required to decode B frames (i.e., a safe value), or a table specifying the bus bandwidth required to decode each respective B frame is transmitted.

Figure 5B:
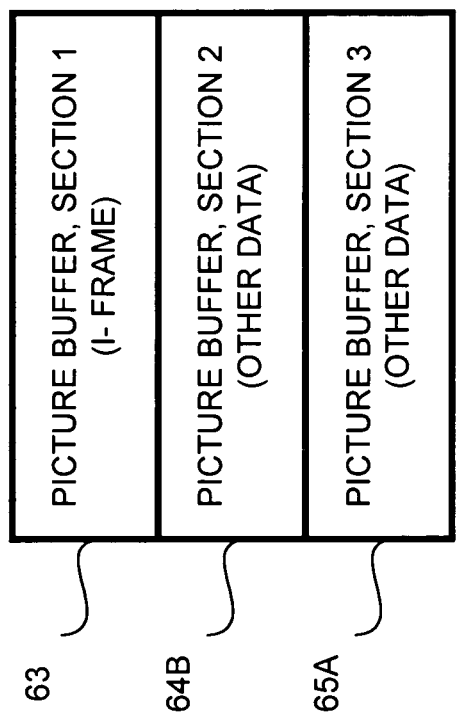
FIG. 5B is a block diagram depicting the contents of the picture buffer of the media memory depicted in FIG. 5A, in accordance with another embodiment of the present invention.

In addition to B frames, the video decoder 81 may need to skip over decompression of a P frame. FIG. 5b is a block diagram that depicts memory space 64B being relinquished through the suspension of P frame decompression and reconstruction. Skipping over B and P frame decompression results in memory spaces 65A and 64B becoming available for storing other data, such as graphical or text data corresponding to an EPG screen. This approach, however, results in higher picture rate degradation. Skipping over a P frame may be caused by the need for bus bandwidth, additional memory, or both. In addition to relinquishing the section of the picture buffer used to retain a future reference picture, the section used to store a past reference picture can be relinquished for a period of time if necessary (e.g., for the benefit of the graphics overlay and alpha-blend-plane). Once a P frame is skipped, all the pictures that depend for reconstruction are either skipped or reconstructed with noticeable artifacts. Furthermore, P frames that depend on a skipped past reference picture will also exhibit visible degradation. For this reason, P frames are not skipped unless there is a strong need for extra resources or the P frames are part of a video stream that does not contain B frames.

Under some circumstances, there may be sufficient memory resources but insufficient bus bandwidth for performing certain DHCT 16 functions concurrently (such as presenting high quality graphical and video images simultaneously). In a bus bandwidth constrained-resource state, rather than decoding all received pictures and presenting them for display at a slower rate, the video decoder 81 skips over pictures while the DENC 84 continues to be fed pictures from media memory 60 at the picture (or field) rate required to refresh the connected Display. Hence, the video decoder 81 decompresses fewer pictures than received in the compressed video stream that is stored in the compressed video buffer 62. Temporal picture scalability (i.e., skipping over pictures) by the video decoder 81 is adapted real-time according to bus bandwidth resources available. Therefore, while in the bus bandwidth constrained-resource-state, a picture may potentially never be degraded.

Some software applications executing on the processor 44 generate graphical and textual objects less frequently than others, thereby demanding less bus bandwidth for transferring objects from system memory 49 to media memory 60. Other software Ha applications produce varied amounts of generated media throughout time. Consequently, the number of decoded B frames versus skipped-over B frames may adapt on a real-time basis according to the demands for bus bandwidth. The actual set of pictures displayed may have varying gaps amongst them depending on which pictures the video decoder 81 skips. For example, a displayed picture sequence may be as follows: $F_1, F_3, F_4, F_7, F_{10}, F_{11}, F_{13}, \ldots F_k$. In one embodiment of the invention, the video decoder 81 is programmed to decompress every other B frame encountered in the compressed MPEG-2 video stream during a constrained bus bandwidth mode as a means of providing suitable bus bandwidth for writing and reading the display buffer 66 and alpha-blend-plane. In another embodiment, the video decoder 81 may be programmed to alternate between skipping the decompression of a pre-specified number of consecutive B frames encountered and decompressing a secondary pre-specified number of consecutive B frames after the skipped B frames. In yet other embodiments, the alternation may be confined within the set of consecutive B frames interspersed between reference pictures in the display order. And in yet another embodiment, the set of consecutive B frames may extend across reference pictures.

Figure 5C:
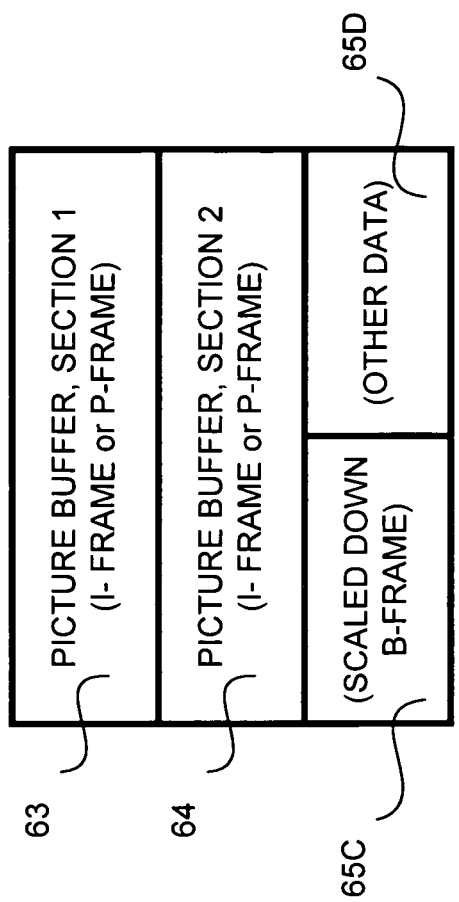
FIG. 5C is a block diagram depicting the contents of the picture buffer of the media memory depicted in FIG. 5B, in accordance with another embodiment of the present invention.

Under some circumstances, there may be ample bus bandwidth but insufficient memory resources for performing certain DHCT 16 functions concurrently (such as presenting high quality graphical and video images simultaneously). FIG. 5C is a block diagram illustrating the storage of a fractional part 65C of a B frame in order to free up memory space 65D for storing other data, such as graphical or text data.

When in this memory constrained-resource state, the video decoder 81 decodes B frames in macroblock raster scan order and stores scaled down reconstructed data in memory (for example, scaled down to a fractional horizontal dimension and/or to a fractional vertical dimension). If a B frame is scaled by one-half in each dimension, then 75 percent of the bus bandwidth as well as 75 percent of the memory required to store the B frames is conserved. The vertical dimension may not need to be downscaled (e.g., when there is sufficient memory to store 50 percent of a third picture in the picture buffer). The higher the resolution and more color depth required for a graphics overlay, the more memory limitations are imposed on the video decoder 81 in the resource-constrained state.

Figure 6:
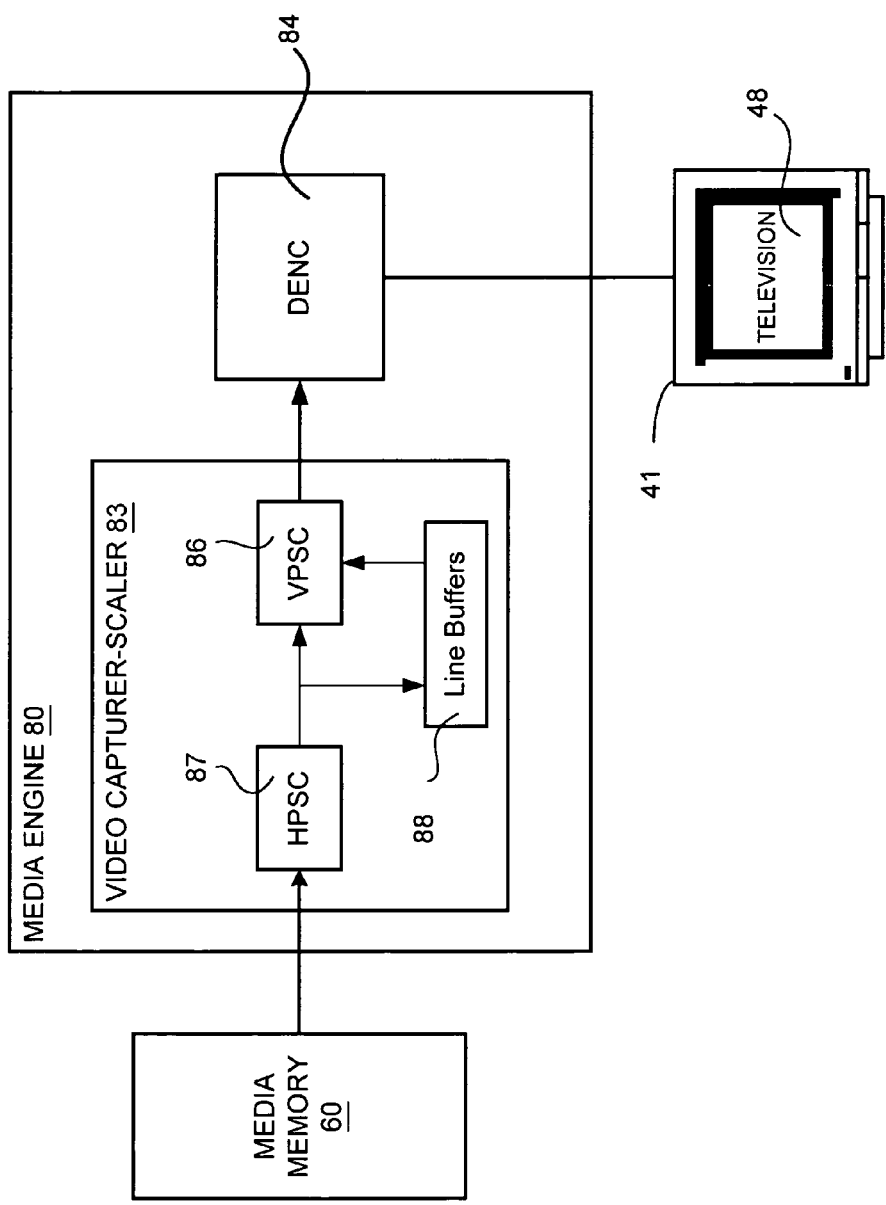
FIG. 6 is a block diagram depicting the flow of video data through the media engine depicted in FIG. 4, in accordance with another embodiment of the present invention.

B frames that are maintained in reduced spatial resolution in the picture buffer are expanded to their original picture resolution on the way to the DENC 84 in the video capturer-scaler 83 of the media engine 80. FIG. 6 depicts part of the internals of the video capturer-scaler 83. The expansion of the B frames' resolution is achieved by a Horizontal Picture Scaling Circuit (HPSC 87) and a Vertical Scaling Picture Circuit (VPSC 86), both located within the video capturer-scaler 83. The output of the video capturer-scaler 83 is routed to output switch 90 and from output switch 90 to input switch 98. The video capture-scaler 83 (and thus HPSC 87 and VPSC 86) are bypassed during the transfer of I and P frames to the DENC 84, but are used to expand B frames with reduced spatial resolution.

Figure 5D:
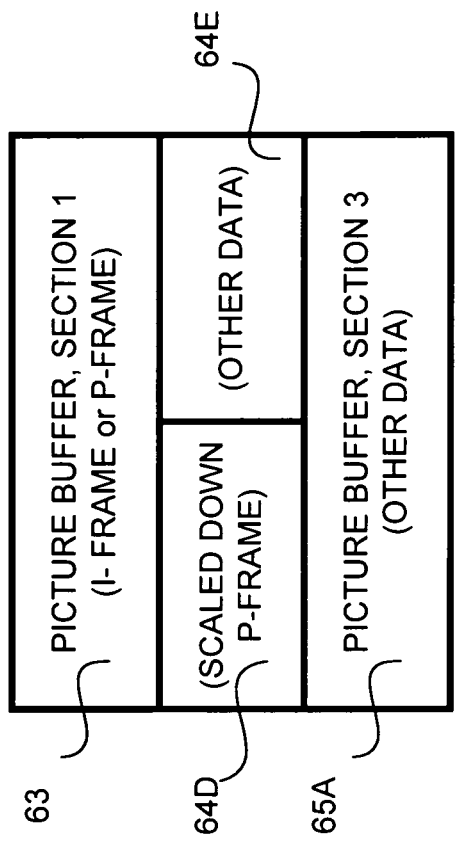
FIG. 5D is a block diagram depicting the contents of the picture buffer of the media memory depicted in FIG. 5C, in accordance with another embodiment of the present invention.

FIG. 5D is a block diagram illustrating a memory constrained state wherein a fractional part 64D of a P frame is stored in memory and wherein B frames are skipped in order to free up memory spaces 64E and 65A respectively for storing other data, such as graphical or text data. The P frames are stored in a scaled down reconstructed format in memory. The vertical dimension may not need to be downscaled (e.g., when there is sufficient memory to store 50 percent of a third picture in the picture buffer). The higher the resolution and more color depth required for a graphics overlay, the more memory limitations are imposed on the video decoder 81 in the resource-constrained state. P frames that are maintained in reduced spatial resolution in the picture buffer are expanded to their original picture resolution on the way to the DENC 84 in the video capturer-scaler 83 of the media engine 80. The HSPC and VSPC are bypassed during the transfer of I frames to the DENC 84, but are used to expand P frames with reduced spatial resolution.

In a preferred embodiment, the video decoder 81 stores two reference pictures in media memory 60, one a past picture in relation to the current picture in the intended display order of moving pictures, the other a future picture. However, it will be understood to those skilled in the art that this invention is applicable to variations in which both reference pictures are past reference pictures or both are future reference pictures. And it will be understood to those skilled in the art that this invention is applicable to variations in which there is only one reference picture, either a past or future reference picture. And it will be understood to those skilled in the art that this invention is applicable to variations in which there are more than two reference pictures and to all possible combinations of past reference pictures and future reference pictures.

In a preferred embodiment, although the video decoder 81 may drop pictures while in a constrained-resource state, the audio decompression by audio decoder 82 in media engine 80 and audio playback continue without neither interruption nor degradation. Regardless of the picture rate, the displayed video pictures continue to correspond to their respective intended presentation time- synchronized with the audio. Since the process of skipping over picture is dynamic according to the resources consumed, the novel method results in an emulated isochronous media channel within the confines of a low-cost multimedia consumer device.

The Quality of Service for digital audio and the quality of graphical and textual objects are maintained at the expense of degrading the video picture rate and/or picture resolution while in the constrained-resource state. Noteworthy is that information changes in the graphics overlay may be presented to the viewer while a video frame is being repeated or may be presented coincidentally with a new video frame.

The insertion of downscaled digital video pictures into the display buffer 66 is typically referred to as captured video. The downscaled digital video pictures originate as reconstructed MPEG-2 video pictures in the picture buffer and therefore consume additional bus bandwidth to store into the display buffer 66 at a pre-specified downscaled picture rate.

In the non-constrained-resource-state, the downscaled digital video picture is transferred into the display buffer 66 by the media engine 80. Under synchronized video timing and employment of internal FIFOs, the media engine 80 reads the reconstructed MPEG-2 video picture from the picture buffer in raster scan order, feeds the picture data through its video capturer-scaler 83 circuit to effectuate downscaling, and stores the downscaled picture data in a designated section of display buffer 66. The video capturer-scaler 83 contains a Horizontal Picture Scaling Circuit (HPSC 87) and a Vertical Picture Scaling Circuit (VPSC 86), possibly with internal memory corresponding to a few line buffers 88, to effectuate the downscaling operation.

As stated above, the most common cause instigating a resource-constrained state is applications that display a downscaled video picture that appears as an embedded picture in a graphical color screen. FIG. 6 is a block diagram illustrating the feeding of reconstructed pictures stored in the media memory 60's picture buffer into the DENC 84 while downscaling the picture's spatial resolution in transit. The feeding of the data is effected by switches (not shown in FIG. 6) in media engine 80. As shown in FIG. 4, the output of the video capturer-scaler 83 is routed to output switch 90 and from output switch 90 to input switch 98 and then through the 3-WAY output switch 89 to the DENC 84. This approach reduces data bus bandwidth consumption in a constrained-resource state and can be employed in combination with an above described embodiment or separately therefrom. The decoded picture ready to be displayed at its designated presentation time is read from media memory 60, one line at a time, and transferred to a Horizontal Picture Scaling Circuit (HPSC 87) inside the video capturer-scaler 83, where it is scaled and output into the DENC 84 according to the timing of the video clock driving the DENC 84.

Vertical scaling may be conveniently implemented by neglecting to read and display selected video picture lines. This approach further reduces consumption of media memory bus bandwidth. Alternatively a Vertical Picture Scaling Circuit (VPSC 86) with internal memory corresponding to a few line buffers 88 is connected to the output of the HPSC 87 to perform vertical picture scaling. In one embodiment of this invention, the HPSC 87 and VPSC 86 reside in the video capturer-scaler 83. A switch connected to the output of the video capturer-scaler 83 controls whether the downscaled picture is written back to media memory 60 or fed to the DENC 84.

By outputting directly from the decoded picture stored in media memory 60, additional bus bandwidth is saved. The picture avoids being transferred to the display buffer 66 in media memory 60 for composition with the other displayed objects. The novel method reads the picture from the decoded picture buffer in media memory 60 at a sufficiently fast rate, continues to drive the DENC 84 with the original video signal clock but positions the downscaled video picture at a desired programmable position within the original spatial picture resolution. The decoded picture is read out of media memory 60 in synchronized timing to a video's horizontal sync signal while a transparent pixel value is specified at each pixel location of the graphics overlay corresponding to a rectangular video display window. The rectangular window size and position in the graphics overlay is such that it coincides with the 2-D spatial size and location, respectively, of the positioned downscaled video picture fed into the DENC 84. Elsewhere in the graphics overlay and alpha-blend-plane, all pixel locations represent an opaque value.

The media engine 80 functions, independent and oblivious to the processing of the video picture, as if opaque portions of the graphics overlay were on top of a non-scaled video picture. But in fact a hole in the graphics overlay is created to coincide with the position of the downscaled video picture. The novel method eliminates the capture (i.e., transfer) of the down scaled video picture into media memory 60' thereby eliminating bus bandwidth to store the downscaled picture into display buffer 66; and eliminates further bus bandwidth by not reading transparent pixels out of display buffer 66 that would otherwise be transmitted to the DENC 84 had video been captured.

Adaptation to 24 Hz Compressed Video

In one embodiment, the system and method of the present invention are capable of transparently adapting to the display field order and repeat field specifications in a compressed progressive picture according to the MPEG-2 video syntax. This feature is used, for instance, in compressed digital 24-Hertz video streams while driving a connected Display at 60 fields per second (i.e., NTSC), and can be employed in combination with an above described embodiment or separately therefrom. Conversion of 24-frame video into 60 fields rate can be easily done via a well-known process called "3:2 pull-down." The process involves alternating between "pulling" three fields from a 24-Hertz progressive picture, followed by pulling two fields from the next 24-Hertz picture.

As previously described, the video decoder 81 interprets all pertinent specified information at the picture level for each picture in the compressed video buffer 62, even when a picture's decompression is skipped. Provisions in the MPEG-2 video syntax specify whether the top of bottom field extracted from a progressive picture is to be displayed first and whether two or three fields from the picture are to be pulled for display. When the display of three fields is specified, the first displayed field is displayed twice; it is fed into the DENC 84 a second time as a third field.

Since six less pictures need to be decompressed per second in 24-Hertz compressed video, the video decoder 81 may not need to skip over decompression of pictures when in a bus bandwidth only resource-constrained state (i.e. when there is enough memory for presenting a user with high quality video and graphics).

If memory is a constraint, the media engine 80 complies with the display field order and repeat field specifications except that when a picture is skipped over, the field repeated is generated from the last picture decompressed rather than from the picture that was skipped. For instance, during decompression of a 24-Hertz video stream, a picture may contribute five rather than two or three fields for display when the following picture in the display order is skipped over. The DENC 84 is still fed the required picture rate, be it in fields or frames as previously described.

The described method does not work when driving a connected progressive Display (i.e., a Display that is fed progressive pictures rather than fields). A picture composed from two fields that originated from different progressive pictures will result in visible artifacts, especially when skipping over the decompression of pictures that are interspersed between the two pictures contributing the fields. Therefore, the novel method feeds progressive video pictures to the DENC 84 when connected to a progressive display.

Adaptation to Low-Delay-Mode and Repeat-Frame-Display

Provisions in the MPEG-2 video syntax specify whether a progressive picture is to be displayed once, twice or three times. This mode is typically employed during low delay mode practices of MPEG that effect fast-forward or fast reverse play operation for applications such as video-on-demand or for lower bit rate video applications. It is obvious that this specification actually yields extra bus bandwidth to the decoder. If the specification to display a picture multiple times was in a skipped over B frame, the video decoder 81 complies by repeating the last decompressed picture.

Elimination of Motion Jitter and Spatial Discontinuities Artifacts

In one embodiment, the system and method of the present invention are capable of eliminating artifacts when decompressing and reconstructing compressed interlaced video pictures. Whereas all the lines in a picture are captured at the same instance of time by a progressive video camera, the alternating lines of the two fields that make up a picture are captured at different time intervals by an interlaced video camera. As fields are repeated and fed into an interlaced or progressive display, care must be exercised not to alter the intended temporal progression of motion in the pictures as expressed by the camera that produced the pictures.

The motion of an interlaced video picture is intended to progress with each field in the picture sequence. Each field represents a different temporal picture representation. Motion jitter artifacts are caused by displaying the alternating fields of a picture over and over while skipping over the decompression and reconstruction of compressed pictures. The faster the motion in the video picture, the more the spatial separation of objects between one field and the next. Whereas the motion expressed by the second field moves objects forward in time, when the first field is displayed again, it retracts the objects in the video picture to their previous spatial location. The jitter artifact caused by this back and forth cycling becomes more perceptually annoying over longer periods of time (i.e., the more pictures skipped over).

To avoid this motion jitter problem, a novel technique is introduced. This novel technique can be employed in combination with an above described embodiment or separately therefrom. The first field in a decompressed interlaced picture is fed into the DENC 84 as both the first and second fields of the picture. Alternatively, the second field may be replicated and displayed if decompressed first. And yet another alternatively is to compute the average of each corresponding line of the two fields and to feed an averaged field into the DENC 84 as both the first and second fields of the picture.

The DENC 84 is still fed the required picture rate, be it in fields or frames as previously described. When a progressive display is driven, the method is still employed because even though jitter artifacts may not manifest, the spatial discontinuities exhibited by seaming the two fields into a frame will become visible artifacts.

Obtaining Resources from Alpha-Blend-Plane

In one embodiment of this invention, if necessary in a memory-constrained state, the alpha-blend-plane is converted into an alpha-field-depth of fewer bits per pixel by truncation, truncation with ordered-dither, or truncation with spatial error-diffusion. Alternatively, the alpha-field is converted to indices that access a small Lookup Table (LUT) stored in memory, wherein each entry of the LUT contains the original number of bits. Therefore, the depth of the field is not compromised but fewer alpha values are supported. Although this alternative results in less overall memory consumption, it does result in additional bus bandwidth consumption, and can be employed in combination with an above described embodiment or separately therefrom.

In the most-constrained case, the alpha-blend-plane is converted to a bitmap with resolution equal to the graphics overlay. Hence, the number of bits in the bitmap equals the number of pixels in the graphics overlay. Each bitmap bit represents whether the spatially corresponding pixel in the graphics overlay, if visible, is opaque or translucent. The alpha-value is stored in a single register internal to the media engine 80 and determines the translucency amount. Alternatively, a two-bit-map is employed and three registers internal to the media engine 80 can be indexed with the three states of translucency expressed by the two-bit field. The fourth state specifies opaque and does not require indexing a register. The three registers are loaded with different predetermined alpha-values for the desired respective levels of translucency.

When internal registers store the alpha-values, the alpha-values are not retrieved from media memory 60. Thus, because the alpha-blend-plane can be read with less bus bandwidth, this method is suitable for both a memory-constrained state and a bus bandwidth constrained state.

In another embodiment of this invention, rather than undergoing the alpha-blendplane conversion while in a resource-constrained state, the alpha-blend-plane is continually specified through any one of the aforementioned alpha-blend-plane reduction methods (i.e. during both constrained and non-constrained states).

Prioritization Scheme Modes

Various priority assignment schemes can be employed with the above described embodiments; each such scheme can be employed in combination with an above described embodiment or separately therefrom. In one embodiment of this invention, the priority assignment map employed by memory controller for operations that access media memory 60 is pre-determined and constant throughout time. In another embodiment of the invention, the priority assignment for each operation cycles through a set of states demarcated as time intervals in relation to the intervals of the video signal and the clock driving the DENC 84. The number of intervals, and thus states, within each cycle is pre-determined and constant; the cycle itself is fixed. The priority assignment within a state is pre-determined and constant. Some operations may be disabled or effectively disabled within a state by lowering the respective priority level to the lowest priority. A cycle may comprise a state corresponding to the vertical blanking interval (VBI), followed by a Line-Refresh state, a Horizontal-Sync state corresponding to the respective time intervals of the video signal, a Line-Refresh state, and a Horizontal-Sync state for each line in the picture.

Furthermore, in one embodiment of this invention, be it operating with stationary priority scheme or cyclic-priority scheme, the memory controller exercises a first priority assignment map while in the non-constrained-resource-state and a secondary priority assignment map while in the constrained-resource-state. Each priority assignment map is tailored for optimized performance for the respective state. In another embodiment of this invention, the memory controller exercises a first priority assignment map that is a stationary priority scheme while in the non-constrained-resource-state and a secondary priority assignment map that is a cyclic-priority scheme while in the constrained-resource-state. In yet another embodiment of this invention, the memory controller exercises a first priority assignment map that is a cyclic-priority scheme while in the non-constrained-resource-state and a secondary priority assignment map that is a stationary-priority scheme while in the constrained-resource-state.

Each of the above mentioned functions, processes, or applications comprise executable instructions for implementing logical functions and can be embodied in any computer-readable medium for use by or in connection with an instruction execution system, apparatus, or device, such as a computer-based system, a processor-containing system, or another system that can execute instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner, and then stored in a computer memory.

It should be emphasized that the above-described embodiments of the present invention, particularly any "preferred embodiments", are merely possible examples of the implementations, merely setting forth a clear understanding of the principles of the inventions. Many variations and modifications may be made to the above-described embodiments of the invention without departing substantially from the spirit of the principles of the invention. All such modifications and variations are intended to be included herein within the scope of the disclosure and present invention and protected by the following claims.

We claim:

1. A method for adapting to resource constraints of a digital home communication terminal (DHCT), said method comprising steps of:
   determining by the DHCT whether one of a resource-constrained mode or a non-resource constrained mode is to be initiated, the DHCT capable of operating in the non-resource constrained mode and a plurality of resource constrained modes;
   responsive to determining that one of the resource-constrained modes is to be initiated, operating the DHCT in the determined resource-constrained mode, including:
      retrieving a set of reconstructed decompressed video frames from a first portion of a memory component, wherein the memory component stores compressed video frames in a distinct second portion, wherein the set of video frames corresponds to a video picture stored in the first portion; and
      transferring the set of retrieved reconstructed decompressed video frames to a display device while downscaling the video picture in transit to the display device.

2. The method of claim 1, further comprising:
   transmitting graphics data to the display device, wherein the graphics data is displayed contemporaneously with the downscaled picture.

3. The method of claim 1, wherein the downscaling comprises horizontal scaling.

4. The method of claim 1, wherein the downscaling comprises vertical scaling.

5. The method of claim 1, wherein the plurality of resource-constrained modes include a memory-constrained mode, a bus bandwidth constrained mode, and a memory and bus-bandwidth constrained mode.

6. A method for adapting to resource constraints of a digital communication terminal (DHCT), said method comprising steps of:
   determining by the DHCT whether one of a plurality of resource-constrained modes is to be initiated, the DHCT capable of operating in a non-resource constrained mode and the plurality of resource-constrained modes;
   responsive to determining that one of the resource-constrained modes is to be initiated, initiating the resource-constrained mode, including:
      retrieving, from a first portion of a memory component, a set of compressed frames;
      storing, in a second and distinct portion of the memory component, a set of decoded frames corresponding to the set of compressed frames, each of the set of decoded frames being at a first spatial resolution;
      retrieving, from the second and distinct portion of the memory component, the set of decoded frames; and
      transferring the retrieved set of decoded frames to a display device while scaling the frames in transit to the display device to a second spatial resolution without storing the frames in the memory component, wherein the second spatial resolution is smaller than the first spatial resolution.

7. The method of claim 6, further comprising the step of:
   transmitting graphics data to the display device, wherein the graphics data is displayed contemporaneously with the scaled video frames.

8. The method of claim 6, wherein the scaling comprises downscaling.

9. The method of claim 6, wherein the scaling comprises horizontal scaling.

10. The method of claim 6, wherein the scaling comprises vertical scaling.

11. The method of claim 6, wherein the plurality of resource-constrained modes include a memory-constrained mode, a bus bandwidth constrained mode, and a memory and bus-bandwidth constrained mode.

12. A digital home communication terminal (DHCT) comprising:
   a processor;
   a circuit configured to operate in a non-resource constrained mode and a plurality of resource-constrained modes, the circuit
   responsive to instantiation of operation in the resource-constrained mode,
      configured in cooperation with the processor to: retrieve, from a first portion of a memory component, a set of compressed frames;
      store, in a second and distinct portion of the memory component, a set of decoded frames corresponding to the set of compressed frames, each of the set of decoded frames being at a first spatial resolution;
      retrieve, from the memory component, the set of decoded frames; and
      transfer the set of decoded frames to a display device while scaling the frames in transit to the display device to a second spatial resolution without storing the frames in the memory component, wherein the second spatial resolution is smaller than the first spatial resolution.

13. The DHCT of claim 12, wherein the circuit in cooperation with the processor is further configured to:
   transmit graphics data to the display device, wherein the graphics data is displayed contemporaneously with the scaled frames.

14. The DHCT of claim 12, wherein the scaling comprises horizontal downscaling.

15. The DHCT of claim 12, wherein the scaling comprises vertical downscaling.

16. The DHCT of claim 12, wherein the plurality of resource-constrained modes include a memory-constrained mode, a bus bandwidth constrained mode, and a memory and bus-bandwidth constrained mode.

17. A method for adapting to resource constraints of a digital home communication terminal (DHCT), said method comprising steps of:
   operating the DHCT in either a non-resource constrained mode or one of a plurality of resource-constrained modes, the DHCT capable of operating in the non-resource constrained mode and the plurality of resource-constrained modes;
   receiving, in a memory component, video frames each comprising a complete picture;
   determining whether one of the resource-constrained modes is to be initiated;
   responsive to determining that one of the resource-constrained modes is to be initiated, initiating the resource-constrained mode, including:
      retrieving the video frames from the memory component; and transferring the retrieved video frames to a display device while downscaling the retrieved video frames in transit to the display device.

18. The method of claim 17, further comprising the step of:
transmitting graphics data to the display device, wherein the graphics data is displayed contemporaneously with the scaled video frames.

19. The method of claim 17, wherein the plurality of resource-constrained modes include a memory-constrained mode, a bus bandwidth constrained mode, and a memory and bus-bandwidth constrained mode.

20. A method, comprising:
retrieving, from a first portion of a memory component, a set of compressed frames;
storing, in a second and distinct portion of the memory component, a set of decoded frames corresponding to the set of compressed frames, each of the set of decoded frames being at a first spatial resolution;
retrieving, from the second and distinct portion of the memory component, the set of decoded frames; and
transferring the retrieved set of decoded frames to a display device while scaling the frames in transit to the display device to a second spatial resolution without storing the frames in the memory component, wherein the second spatial resolution is smaller than the first spatial resolution.

* * * * *